(12) United States Patent
Landman

(10) Patent No.: US 11,328,096 B2
(45) Date of Patent: May 10, 2022

(54) DATA BUNDLE GENERATION AND DEPLOYMENT

(71) Applicant: JFrog Ltd., Netanya (IL)

(72) Inventor: Yoav Landman, Netanya (IL)

(73) Assignee: JFROG, LTD., Netanya (IL)

( * ) Notice: Subject to any disclaimer, the term of this patent is extended or adjusted under 35 U.S.C. 154(b) by 0 days.

(21) Appl. No.: 16/898,174

(22) Filed: Jun. 10, 2020

(65) Prior Publication Data

US 2020/0349292 A1    Nov. 5, 2020

Related U.S. Application Data

(63) Continuation of application No. 16/399,905, filed on Apr. 30, 2019.

(51) Int. Cl.
| | |
|---|---|
| *G06F 21/64* | (2013.01) |
| *G06F 8/60* | (2018.01) |
| *H04L 9/08* | (2006.01) |
| *H04L 9/32* | (2006.01) |
| *G06F 21/56* | (2013.01) |

(52) U.S. Cl.
CPC .............. *G06F 21/64* (2013.01); *G06F 8/60* (2013.01); *G06F 21/565* (2013.01); *H04L 9/0825* (2013.01); *H04L 9/3236* (2013.01)

(58) Field of Classification Search
CPC .......... G06F 21/64; G06F 8/60; G06F 21/565; H04L 9/0825; H04L 9/3236
USPC ....................................................... 713/126
See application file for complete search history.

(56) References Cited

U.S. PATENT DOCUMENTS

| | | | |
|---|---|---|---|
| 5,671,282 A | 9/1997 | Wolff et al. | |
| 5,915,238 A * | 6/1999 | Tjaden | G10H 1/0033 |
| | | | 704/251 |
| 5,931,946 A | 8/1999 | Terada et al. | |
| 6,604,236 B1 | 8/2003 | Draper et al. | |
| 7,007,042 B2 | 2/2006 | Lubbers et al. | |
| 7,403,901 B1 | 7/2008 | Carley et al. | |

(Continued)

OTHER PUBLICATIONS

Patent Cooperation Treaty, International Search Report and Written Opinion issued for PCT Application No. PCT/IB2020/056777, dated Oct. 19, 2020, 15 pages.

(Continued)

*Primary Examiner* — Shewaye Gelagay
*Assistant Examiner* — Moeen Khan
(74) *Attorney, Agent, or Firm* — Norton Rose Fulbright US LLP

(57) ABSTRACT

The present disclosure provides a method, system, and device for distributing a software release. To illustrate, based on one or more files for distribution as a software release, a release bundle is generated that includes release bundle information, such as, for each file of the one or more files, a checksum, meta data, or both. One or more other aspects of the present disclosure further provide sending the release bundle to a node device. After receiving the release bundle at the node device, the node device receives and stores at least one file at a transaction directory. After verification that each of the one or more files is present/available at the node device, the one or more files may be provided to a memory of a node device and meta data included in the release bundle information may be applied to the one or more files transferred to the memory.

25 Claims, 26 Drawing Sheets

(56) References Cited

U.S. PATENT DOCUMENTS

| | | | |
|---|---|---|---|
| 7,814,146 B2 | 10/2010 | Chavez et al. | |
| 8,036,140 B2 | 10/2011 | Rao et al. | |
| 8,196,186 B2 | 6/2012 | Mityagin et al. | |
| 8,239,446 B2 | 8/2012 | Navar et al. | |
| 8,364,758 B2 | 1/2013 | Hydrie et al. | |
| 8,413,198 B2 | 4/2013 | Connor et al. | |
| 9,053,124 B1 | 6/2015 | Dornquast et al. | |
| 9,280,339 B1 * | 3/2016 | Prunicki | G06F 8/76 |
| 9,635,107 B2 | 4/2017 | Souza et al. | |
| 9,659,155 B2 | 5/2017 | Kosovan | |
| 9,819,665 B1 | 11/2017 | Machani | |
| 9,842,062 B2 | 12/2017 | Ford et al. | |
| 10,091,215 B1 | 10/2018 | Word | |
| 10,409,838 B1 | 9/2019 | George et al. | |
| 10,701,143 B1 | 6/2020 | Jha et al. | |
| 10,719,369 B1 | 7/2020 | Aithal et al. | |
| 10,754,952 B2 * | 8/2020 | Muller | G06F 21/64 |
| 10,785,334 B2 | 9/2020 | Kristiansson et al. | |
| 10,812,975 B1 | 10/2020 | Easwar Prasad et al. | |
| 10,880,407 B2 | 12/2020 | Reynolds et al. | |
| 10,911,337 B1 | 2/2021 | De Kosnik et al. | |
| 10,986,387 B1 | 4/2021 | Parulkar et al. | |
| 11,048,590 B1 | 6/2021 | Sapuntzakis et al. | |
| 11,064,323 B2 | 7/2021 | Esselink et al. | |
| 2002/0062439 A1 | 5/2002 | Cotugno et al. | |
| 2002/0156893 A1 | 10/2002 | Pouyoul et al. | |
| 2003/0220880 A1 | 11/2003 | Lao et al. | |
| 2004/0181561 A1 | 9/2004 | Knox et al. | |
| 2004/0250115 A1 | 12/2004 | Gemmel et al. | |
| 2005/0132348 A1 * | 6/2005 | Meulemans | H04L 67/1095 717/168 |
| 2006/0107286 A1 | 5/2006 | Connor et al. | |
| 2006/0195816 A1 | 8/2006 | Grandcolas et al. | |
| 2007/0294686 A1 * | 12/2007 | Oh | G06F 8/658 717/168 |
| 2008/0005113 A1 | 1/2008 | Li | |
| 2008/0005120 A1 | 1/2008 | Li | |
| 2008/0082648 A1 | 4/2008 | Ahmed et al. | |
| 2008/0294860 A1 | 11/2008 | Stakutis et al. | |
| 2009/0013317 A1 * | 1/2009 | Abfalter | G06F 8/65 717/170 |
| 2009/0083812 A1 | 3/2009 | Tang | |
| 2009/0119655 A1 | 5/2009 | Quilty | |
| 2009/0144340 A1 | 6/2009 | Ferguson et al. | |
| 2009/0290715 A1 | 11/2009 | Mityagin et al. | |
| 2009/0313353 A1 | 12/2009 | Lou | |
| 2010/0217694 A1 | 8/2010 | Knighton | |
| 2010/0223472 A1 | 9/2010 | Alvarsson | |
| 2010/0287363 A1 | 11/2010 | Thorsen | |
| 2011/0010258 A1 | 1/2011 | Chavez et al. | |
| 2011/0010421 A1 | 1/2011 | Chavez et al. | |
| 2011/0071841 A1 | 3/2011 | Fomenko et al. | |
| 2011/0072075 A1 | 3/2011 | Gautier | |
| 2011/0107419 A1 | 5/2011 | Vidal et al. | |
| 2011/0113012 A1 | 5/2011 | Gruhi et al. | |
| 2011/0225311 A1 | 9/2011 | Liu et al. | |
| 2011/0307564 A1 | 12/2011 | Luo et al. | |
| 2012/0131566 A1 | 5/2012 | Morgan | |
| 2012/0151051 A1 | 6/2012 | Zhang et al. | |
| 2012/0151245 A1 | 6/2012 | Chang et al. | |
| 2012/0159469 A1 | 6/2012 | Laor | |
| 2012/0233134 A1 | 9/2012 | Barton et al. | |
| 2012/0240096 A1 | 9/2012 | Sass | |
| 2012/0259920 A1 | 10/2012 | Mathieu et al. | |
| 2012/0297405 A1 | 11/2012 | Zhang et al. | |
| 2013/0073727 A1 | 3/2013 | Souza et al. | |
| 2013/0081100 A1 | 3/2013 | Sreehari et al. | |
| 2013/0124807 A1 | 5/2013 | Nielsen et al. | |
| 2013/0132946 A1 | 5/2013 | Ma | |
| 2014/0172972 A1 | 6/2014 | Burba et al. | |
| 2014/0173024 A1 | 6/2014 | Burba et al. | |
| 2014/0245376 A1 | 8/2014 | Hibbert et al. | |
| 2015/0003296 A1 | 1/2015 | Fan et al. | |
| 2015/0088992 A1 | 3/2015 | Ioannidis et al. | |
| 2015/0099510 A1 | 4/2015 | Shah et al. | |
| 2015/0172352 A1 | 6/2015 | Gopalakrishnan et al. | |
| 2015/0268881 A1 | 9/2015 | Nielsen et al. | |
| 2015/0301823 A1 | 10/2015 | Hatakeyama | |
| 2015/0302037 A1 | 10/2015 | Jackson et al. | |
| 2015/0312243 A1 | 10/2015 | Ponsford et al. | |
| 2015/0317145 A1 * | 11/2015 | Katariya | G06Q 10/10 717/173 |
| 2015/0341178 A1 | 11/2015 | Tanaka et al. | |
| 2015/0341325 A1 | 11/2015 | Al Jabri | |
| 2015/0350186 A1 | 12/2015 | Chan et al. | |
| 2016/0006837 A1 | 1/2016 | Reynolds et al. | |
| 2016/0117235 A1 | 4/2016 | Mishra et al. | |
| 2016/0124665 A1 | 5/2016 | Jain et al. | |
| 2016/0164900 A1 | 6/2016 | Pericin | |
| 2016/0179867 A1 | 6/2016 | Li et al. | |
| 2016/0182494 A1 | 6/2016 | Lissounov et al. | |
| 2016/0234237 A1 | 8/2016 | Thakar et al. | |
| 2016/0266890 A1 | 9/2016 | Aleksandrov et al. | |
| 2016/0267101 A1 | 9/2016 | Clissold et al. | |
| 2016/0373440 A1 | 12/2016 | Mather et al. | |
| 2017/0003951 A1 | 1/2017 | Newell et al. | |
| 2017/0034023 A1 | 2/2017 | Nickolov et al. | |
| 2017/0060546 A1 | 3/2017 | Prasad et al. | |
| 2017/0147338 A1 | 5/2017 | Jackson et al. | |
| 2017/0262657 A1 | 9/2017 | Salmon-Legagneur et al. | |
| 2017/0264588 A1 | 9/2017 | Hunt et al. | |
| 2017/0300309 A1 | 10/2017 | Berger et al. | |
| 2017/0371499 A1 | 12/2017 | Checkley et al. | |
| 2018/0095993 A1 | 4/2018 | Clark | |
| 2018/0189043 A1 * | 7/2018 | Habayeb | H04L 67/34 |
| 2018/0260212 A1 | 9/2018 | Wisnovsky | |
| 2018/0373517 A1 | 12/2018 | Hu | |
| 2019/0014161 A1 | 1/2019 | Doar et al. | |
| 2019/0050576 A1 * | 2/2019 | Boulton | G06F 21/562 |
| 2019/0080080 A1 | 3/2019 | Ogura et al. | |
| 2019/0130114 A1 | 5/2019 | Smith et al. | |
| 2019/0205121 A1 * | 7/2019 | Ericson | H04L 9/0643 |
| 2019/0306173 A1 | 10/2019 | Reddy et al. | |
| 2019/0332367 A1 | 10/2019 | Navarrete Michelini et al. | |
| 2019/0379723 A1 | 12/2019 | Demasi et al. | |
| 2020/0012441 A1 | 1/2020 | Chheda et al. | |
| 2020/0026857 A1 | 1/2020 | Muller et al. | |
| 2020/0084202 A1 | 3/2020 | Smith et al. | |
| 2020/0162543 A1 | 5/2020 | Mosko et al. | |
| 2020/0186505 A1 | 6/2020 | Amar et al. | |
| 2020/0351089 A1 | 11/2020 | Wentz | |
| 2020/0372183 A1 | 11/2020 | Rangaiah et al. | |
| 2020/0409986 A1 | 12/2020 | Soroushian et al. | |
| 2020/0412691 A1 | 12/2020 | Shribman et al. | |
| 2021/0218800 A1 | 7/2021 | Landman | |

OTHER PUBLICATIONS

Li et al. "A Quantitative and Comparative Study of Network-Level Efficiency for Cloud Storage Services," ACM Trans. Model. Perform. Eval. Comput. Syst., vol. 4, No. 1, Article 3, 2019, 32 pages.

Jana et al. "Management of Security and Privacy Issues of Application Development in Mobile Cloud Environment: A Survey," IEEE International Conference on Recent Advances and Innovations in Engineering, May 2014, 6 pages.

Patent Cooperation Treaty, International Search Report and Written Opinion issued for PCT Application No. PCT/IB2020/056776, dated Feb. 22, 2021, 10 pages.

Post, H. et al., "Linking Functional Requirements and Software Verification," 2009 17th IEEE International Requirements Engineering Conference, 2009, 8 pages.

Patent Cooperation Treaty, International Search Report and Written Opinion issued for PCT Application No. PCT/IB2021/050134, dated Mar. 4, 2021, 14 pages.

JFrog; "Access Tokens," https://www.jfrog.com/confluence/display/JCR6X/Access+Tokens, Jan. 29, 2020 (Year: 2020), 1 page.

Alibaba Cloud; "Alibaba Dragonfly DCOS Case Study: China Mobile (Zhejiang Branch)," https://alibaba-cloud.medium.com/alibaba-dragonfly-dcos-case-study-china-mobile-zhejiang-branch-a13dc751a2c, Jan. 14, 2019 (Year: 2019), 14 pages.

(56) References Cited

OTHER PUBLICATIONS eduonix.com; "Alibaba's DragonFly—A New P2P File Distribution Framework," https://blog.eduonix.com/software-development/alibabas-dragonfly-p2p-distribution/, Jul. 4, 2018 (Year: 2018), 3 pages.

Alibaba Cloud; "Behind Alibaba's Double 11 Mysterious "Dragonfly" Technology® C PB-Grade Large-File Distribution System," https://www.alibabacloud.com/blog/behind-alibabas-double-11-mysterious-dragonfly-technology-®c-pb-grade-large-file-distribution-system 594074, Oct. 15, 2018 (Year: 2018), 14 pages.

Seneviratne, AIDK; "Enabling an Authentication Mechanism for Docker Remote API," Mar. 2017 (Year: 2017), 70 pages.

IEEE; "FID: A Faster Image Distribution System for Docker Platform," 2017 (Year: 2017), 8 pages.

DragonFly; "What is DragonFly?" https://web.archive.org/web/20190501065255/https://d7y.io/enus/docs/overview/what_is_dragonfly.html, May 1, 2019 (Year: 2019), 3 pages.

Uber Engineering Blog; "Introducing Kraken, an Open Source Peer-to-Peer Docker Registry," https://eng.uber.com/introducing-kraken/, May 5, 2019 (Year: 2019), 3 pages.

JFrog; "Searching for Artifacts," https://www.jfrog.com/confluence/display/JCR6X/Searching+for+Artifacts, Jan. 29, 2020 (Year: 2020), 3 pages.

* cited by examiner

1000

| Release Bundles | | | | | |
|---|---|---|---|---|---|
| 1 Release Bundle | | | | 1004 — ⊕ Add a release bundle | |
| Filter | | | |  | |
| Name ∧ | Latest Version | Distribution ID | Started | Status | Progress |
| Quadcopter_firmwares | 12.1 | 1 | 10 May 2018, 14:20:17 | ⊘ Completed | 100% (1 of 1) |

New Release Bundle

General Details

1012 {
- Name * — 1020  Description — 1024
  - qq
- Version* — 1022
  - Demo

Spec

1014 {
- Source Artifactory*
  - Artifactory1 ▼ — 1030
  - 1036 — ✓ Create Query
- Name ∧ — 1032   Query — 1034
- q11   Repositories: artifactory-rpm Release Notes 1016 {
- Plain Text ▼ — 1040   1042 — Edit | Preview — 1044
- [            ]
- 1046 Cancel | 1048 Create | 1050 Create & Sign

Add AQL Query ⟶ 1102 ⟶ 1104 ⟶ 1106    X

Query Details ▶ Preview Artifacts ▶ Additional Details

Name *
[quadcopter-plus] ⟵ 1108

AQL* ⟶ 1110

```
1    items.find{
2      {
3        "$or":
4        [
5          {
6            "$and":
7            [
8              {"artifact.module.build.name" : "my_debian_build"}
9              {"name" : {"$match" : "*.deb"}}
10           ]
11         }
```

1114 ⟶
1112 ⟶ [Cancel] [Next]

Add Query

Query Details ▶ Preview Artifacts ▶ Additional Details

2 Artifacts
[Filter]

1128 ⟶
Artifact ⟶ 1122    Path ⟶ 1124              Analyzer Status    Size commons-4.69.jar         maven/commons/4.69/commons-4.69.jar    ⓘ Blocked     1.4 kB
distribution-logs.tar.gz  maven/distribution-logs.tar.gz        1126 ⟶ ✓      705.3 kB 1132 ⟶  1134 ⟶
1130 ⟶ [Cancel] [Back] [Next]

Add Query

X Cannot create release bundle from unlicensed repository application jrft@01cy1xymqj4z7r1q89ve21r2v.Licence type: ENTERPRISE_PLUS, license status: EXPIRED  X  — 1142  X Query Details > Preview Artifacts > Additional Details 0 Artifacts Filter Artifact  Path  Size No Artifacts Cancel | Back | Next

Add AQL Query  X

Query Details > Preview Artifacts > Additional Details

Additional Properties ⓘ
Name | Values  ⊕ } 1152

Path Mappings ⓘ                                Use Template ✓
docker-local/{1} | docker-target/{1}  ⊕ } 1154

Cancel | Back | Save

| Content | Release Notes | Distribution Tracking | Spec |
|---|---|---|---|

View: Artifacts | Builds | Release Bundle Info

1222

∨ Files (2)

commons-4.69.jar
maven/commons/commons/4.69/commons-4.69.jar
distribution-logs.tar.gz
maven/distribution-logs.tar.gz

1224

File Name: commons-4.69.jar
SHA-256: 708cb22b46fba408345582ecd51aa9eb4915c1c392...
Source Path: maven/commons/commons/4.69/commons-4.69.jar
Target Path: maven/commons/commons/4.69/commons-4.69.jar
Size: 1.4 kB
Analyzer Status: ⓘ Blocked

FIG. 12C

1230 qq                                                                    Actions ∨

| Version | State | Description | Created | Status | Size |
|---|---|---|---|---|---|
| Demo | 🔒 signed | | 19 August 2018, 13:4... | ⊘ Completed | 338.0 bytes |

| Content | Release Notes | Distribution Tracking | Spec |
|---|---|---|---|

No release notes

1232

Versions (3)
Demo
Copy of 1.5
1.5

1240

| rb1 | | | | | | |
|---|---|---|---|---|---|---|
| Versions (1) | Version | State | Description | Created | Status | Size |
| 1.2 | 1.2 |  Signed | | 06 January 2019, 15:13:33 | ⊗ Failed | 170.9 MB |

Content    Release Notes    Distribution Tracking    Spec

7 Distributions

Filter — 1242

7 Distributions    1244 → Redistribute ⊗ Delete 1 out of 1 < >

| ID | Action | Started | Destination | Status | Progress | Details |
|---|---|---|---|---|---|---|
| 4 | Distribute | 06 January 2019, 17... | artifactory-edge2 | ⊗ Failed | 0% (0 of 13) | 1 Error |
| 4 | Distribute | 06 January 2019, 17... | artifactory-edge3 | ⊗ Failed | 0% (0 of 13) | 1 Error |
| 4 | Distribute | 06 January 2019, 17... | artifactory-edge1 | ⊘ Complete | 100% (13 of 13) | Distribution complet... |
| 3 | Distribute | 06 January 2019, 17... | artifactory-edge3 | ⊗ Failed | 0% (0 of 13) | 1 Error |
| 3 | Distribute | 06 January 2019, 17... | artifactory-edge2 | ⊗ Failed | 0% (0 of 13) | 1 Error |
| 2 | Distribute | 06 January 2019, 17... | artifactory-edge1 | ⊘ Complete | 100% (13 of 13) | Distribution complet... |
| 1 | Distribute | 06 January 2019, 17... | artifactory-edge1 | ⊗ Failed | 0% (0 of 13) | 1 Error |

FIG. 12D

| Spec | Content | Release notes | Distribution Tracking |

Source Artifactory: artifactory1

∨ quadcopter-pro  ⎯1252

Repositories
artifactory-generic

Included Artifact Patterns
*

Path Mappings

| Input ∧ | Output |
|---|---|
| (.*)/(.*) | prod_generic/$2 |

Additional Properties

| Key ∧ | Values |
|---|---|
| rb | rb-qf |
| rb1 | rb1 |

| | Release bundles — 1704 — 1706 | | |
|---|---|---|---|
| Home | Received | Distributable | |
| Artifacts | | | |
| Packages | 2 Items | | |
| Search | Filter | | 1 out of 1 < > |
| Release Bundles | Bundle name ∧ | Latest Version | Created |
| Builds | Bundle | 2.0 | 9 October, 2018 14:45:10 +0300 |
| Admin | Bundle1 | 1.0.0 | 9 October, 2018 14:45:10 +0300 |

| | helmBundleTest < Back to all bundles | | | | |
|---|---|---|---|---|---|
| Home | | | — 1714 | | |
| Artifacts | Version List | Version | Short Description | Creation Date 9 October, 2018 11:00:13 | Size 411 MB |
| Packages | 1.0 | 1 | | | |
| Search | — 1712 | Lists of artifacts | | | |
| Release Bundles | | ∨ Files (2) | | Name: helm-3.2.0.0.tgz Path: helm-lcc/helm-3.2.0.0.tgz Created: Admin Size 3.0 MB | |
| Builds | | helm-3.2.0.0.tgz helm/helm-3.2.0.0.tgz | | | |
| Admin | | helm-4.1.0.0.tgz helm/helm-4.1.0.0.tgz | | — 1718 | |
| | | helm-5.1.0.0.tgz helm/helm-5.1.0.0.tgz | — 1716 | | |
| | | helm-4.2.0.0.tgz helm/helm-4.2.0.0.tgz | | | |
| | | helm-3.1.0.0.tgz helm/helm-3.1.0.0.tgz | | | |
| | | helm-2.2.0.0.tgz helm/helm-2.2.0.0.tgz | | | |

| Home | Repository Browser | 🔧 Set Me Up  ⇧ Deploy |
|---|---|---|
| Artifacts | Tree Simple 🔍 ⭐ | release bundles ⌄ Actions |
| Packages | > docker | General Effective Permissions Properties Watchers |
| Search | dist1 | Info |
| Release Bundles | ∨ release-bundles ├─> bundle ├─> bundle1 └─∨ helm//bundle  ├─> 0.1 artifactory.rpm  └─> 0.2 artifactory.rpm > artifactory-generic > 0.2 artifactory.rpm  0.1 artifactory.rpm > example-rpm-local  as-service-docker.local > as-service-generic.local  docker-release > jcenter  jcenter-cache > Trash Can | Name: release-bundles  Package Type: ReleaseBundles  Repository Part: release-bundles  Created: 09-10-18 09:33:01+00.00 |
| Builds | | |
| Admin | | |

| Home | Quadcopter-Downloads < Back to all bundles | | | |
|---|---|---|---|---|
| Artifacts | Version List | Version | Short Description | Creation Date | Size |
| Packages | 1.2 ⊗ | 1.2 | Firmware download center | 27 Sept., 2018 11:00:13 | 26.2 kB |
| Search | └─1902 | Lists of artifacts | | |
| Release Bundles | | ∨ Files (2) | Name: helm-3.2.0.0.tgz | |
| Builds | | helm-3.2.0.0.tgz helm/helm-3.2.0.0.tgz helm-4.1.0.0.tgz | Path: helm-lcc/helm-3.2.0.0.tgz Created: Admin Size 3.0 MB | |
| Admin | | | | |

*FIG. 19A* quadcopter-firmwares

| Versions (3) | Version | Description | Created | Status | ∨ Actions |
|---|---|---|---|---|---|
| 1.2 | 1.20 | Download center for quadcopter devices | 13 May 2018, 13:02:35 | ⊘ Completed | ◯ Distribute Version |
| 1.10 | | | | | ▭ Clone Version |
| 1.0 | | | | | ⊗ Delete |

| Artifacts | Release Notes | Distribution Tracking | Release Bundle Info |
|---|---|---|---|

∨ Files (2)
bash-4.2.46-28.el7.x86_64.rpm
artifactory-rpm/bash-4.2.46-28.el7.x86_64.rpm
bintray-client-java-api-0.9.2.jar
artifactory-generic/binary-client-java-api-0.9.2.jar File Name: bash-4.2.46-28.el7.x86_64.rpm
SHA-256: fd1f4560185b7bdccfe30cd0e1dba33dba0a08c31939759eSc3...
Source Path: artifactory.rom/bash-4.2.46-28.el7.x86_64.rpm
Target Path: artifactory-rpm/bash-4.2.46-28.el7.x86_64.rpm
Size: 338.0 bytes

*FIG. 19B*

DATA BUNDLE GENERATION AND DEPLOYMENT

CROSS-REFERENCE TO RELATED APPLICATIONS

The present application is a continuation of U.S. patent application Ser. No. 16/399,905 filed Apr. 30, 2019, entitled "DATA BUNDLE GENERATION AND DEPLOYMENT"; and is related to U.S. patent application Ser. No. 16/399,915 filed Apr. 30, 2019, entitled "ACTIVE-ACTIVE ENVIRONMENT CONTROL", U.S. patent application Ser. No. 16/399,938 filed Apr. 30, 2019 entitled "DATA FILE PARTITION AND REPLICATION", and U.S. patent application Ser. No. 16/399,953 filed Apr. 30, 2019 entitled "DATA FILE PARTITION AND REPLICATION", the contents of each of which are incorporated by reference herein in their entirety.

TECHNICAL FIELD

The present application is generally related to the technical field of software deployment, and more particularly, but not by way of limitation, to techniques for software distribution.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Software can be updated to add or remove functionality, to correct bugs (e.g., critical/functional issues), and/or to address security issues. To update a piece of software, a new version is developed and deployed to a device, such as a software consumable device that stores and executes the new version of the software.

To deploy a new version of software, a memory device including the new version of the software can be physically connected and uploaded to a target device. Deploying software in such a manner can be time consuming, resource (e.g., personnel) intensive, and is impractical for software to be deployed to multiple locations or for service-oriented architecture that may require multiple updates for different pieces of software at different times. Alternatively, the new version of the software can be deployed via one or more networks. However, deployment of software via a network presents its own challenges. For example, a device to receive the software needs to be connected to the network and maintain a sufficient network connection to receive the entire version of the software. As another example, the network itself must have sufficient bandwidth and acceptable latencies to enable the software to be deployed. Additionally, software needs to be deployed in a secure manner so that unauthorized updates and/or deployments are avoided. Thus, deploying software efficiently, consistently, and securely poses many difficult challenges.

BRIEF SUMMARY

Embodiments of the present disclosure provide systems, methods, and computer-readable storage media that provide for distributing a software release. For example, a server (e.g., deployment system/application) may identify one or more files for distribution as a software release and generate a release bundle that includes release bundle information. To illustrate, the release bundle information may include, for each file of the one or more files, a checksum, meta data, or both. In some implementations, a signature may be attached to the release bundle to make the release bundle immutable. The server is configured to send the release bundle to a node device. After sending the release bundle, the server may send at least one file of the one or more files (of the software release) to the node device. Responsive to receiving the release bundle, the node device may identify a transaction directory and store the received at least one file at the transaction directory. In some implementations, the transaction directory may be a temporary transaction directory from which the bundle files are available for download via an API. The node device may further verify that each of the one or more files is present/available at the node device prior to providing the one or more files to a memory of a node device and applying meta data (included in the release bundle information) to the one or more files transferred to the memory. Thus, the server/application described herein enables generation and/or use of a release bundle to efficiently, consistently, and securely distribute software. Additionally, the release bundle provided to a node device may advantageously be used to identify/verify a source of the release bundle, identify/verify the one or more files, and arrange/assemble the one or more files. Additionally, or alternatively, one or more release bundles corresponding to software may be analyzed to troubleshoot an issue with the software and/or revert to a prior version of the software. In some implementations, the release bundle may be signed to render the release bundle immutable, thereby protecting the release bundle from tampering and increasing security of the software release.

According to one embodiment, a method for distributing a software release is described. The method includes receiving an indication from a distributor device of one or more files for distribution. The method further includes generating a bundle based on the one or more files, the bundle including release bundle information generated based on the one or more files, and attaching a signature to the bundle to generate a signed bundle. The method also includes receiving a selection from the distribution device of one or more node devices to receive the signed bundle, and initiating transmission of the signed bundle to each of the one or more node devices.

According to yet another embodiment, a system for distributing a software release is described. The system includes at least one memory storing instructions and one or more processors coupled to the at least one memory. The one or more processors are configured to execute the instructions to cause the one or more processors to receive an indication from a distributor device of one or more files for distribution. The one or more processors are further configured to execute the instructions to cause the one or more processors to generate a bundle based on the one or more files, and attach a signature to the bundle to generate a signed bundle. The one or more processors can further be configured to receive a selection from the distribution device of one or more node devices to receive the signed bundle, and initiate transmission of the signed bundle to each of the one or more node devices.

According to another embodiment, a computer program product is described that includes a computer-readable storage device, such as a non-transitory computer-readable storage medium, that includes instructions that, when executed by one or more processors, cause the one or more processors to perform operations for distributing a software release. The operations include executing a first routine to receive an indication from a distributor device of one or more files for distribution. The operations further include executing a second routine to generate a bundle based on the one or more files, the bundle including release bundle information generated based on the one or more files. The operations also include executing a third routine to attach a signature to the bundle to generate a signed bundle, executing a fourth routine to receive a selection from the distribution device of one or more node devices to receive the signed bundle, and executing a fifth routine to initiate transmission of the signed bundle to each of the one or more node devices.

According to another embodiment, a method for receiving a software release is described. The method includes initiating a release bundle transaction session corresponding to a software release, and receiving a bundle including signed release bundle information. The method further includes verifying a source of the signed release bundle information, and after verification of the source, identifying a transaction directory. In some implementations, the transaction directory may be a temporary transaction directory. The method also includes verifying each of one or more files corresponding to the signed release bundle information is included in the transaction directory, and closing the release bundle transaction session in response to verification, based on the signed release bundle information, that each of the one or more files is included in the transaction directory. In some such implementations, closure of the release bundle transaction in response to the verification makes the bundle files available for download via an API. For example, the bundle files may be made available from the transaction directory (e.g., a temporary transaction directory), or may be stored from the transaction directory to another portion of a memory (or to a different memory) and made available from the other portion of the memory (or from the different memory).

According to yet another embodiment, a system for receiving a software release is described. The system includes at least one memory storing instructions and one or more processors coupled to the at least one memory. The one or more processors are configured to execute the instructions to cause the one or more processors to initiate a release bundle transaction session corresponding to a software release, and receive a bundle including signed release bundle information. The one or more processors are further configured to execute the instructions to cause the one or more processors to verify a source of the signed release bundle information, and after verification of the source, identify a transaction directory. The one or more processors are also configured to execute the instructions to cause the one or more processors to verify each of one or more files corresponding to the signed release bundle information is included in the transaction directory. The one or more processors are also configured to execute the instructions to cause the one or more processors to close the release bundle transaction session in response to verification, based on the signed release bundle information, that each of the one or more files is included in the transaction directory. In some such implementations, closure of the release bundle transaction in response to the verification makes the one or more files corresponding to the software release available for download via an application program interface (API).

According to another embodiment, a computer program product is described that includes a computer-readable storage device, such as a non-transitory computer-readable storage medium, that includes instructions that, when executed by one or more processors, cause the one or more processors to perform operations for distributing a software release. The operations include executing a first routine to initiate a release bundle transaction session corresponding to a software release, and executing a second routine to receive a bundle including signed release bundle information. The operations further include executing a third routine to verify a source of the signed release bundle information, and executing a fourth routine to, after verification of the source, identify a transaction directory. The operations also include executing a fifth routine to verify each of one or more files corresponding to the signed release bundle information is included in the transaction directory, and executing a sixth routine to close the release bundle transaction session in response to verification, based on the signed release bundle information, that each of the one or more files is included in the transaction directory. In some such implementations, closure of the release bundle transaction in response to the verification makes the one or more files corresponding to the software release available for download via an application program interface (API).

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which:

FIGS. 10A-10B illustrate examples of views associated with creating a release bundle;

FIGS. 11A-11D illustrate examples of views associated with adding a query to create a release bundle;

FIGS. 12A-12G illustrate examples of views associated with viewing a release bundle;

FIGS. 15A-15B illustrate examples of views associated with distributing a release bundle;

FIGS. 16A-16C illustrate examples of views associated with distributing a prior version of a release bundle;

FIGS. 17A-17B illustrate examples of views associated with viewing distributed release bundles;

FIG. 18 illustrates an example of a view associated with a release bundle repository; and FIGS. 19A-19C illustrate examples of views associated with deleting a release bundle.

DETAILED DESCRIPTION OF THE INVENTION

Figure 1:
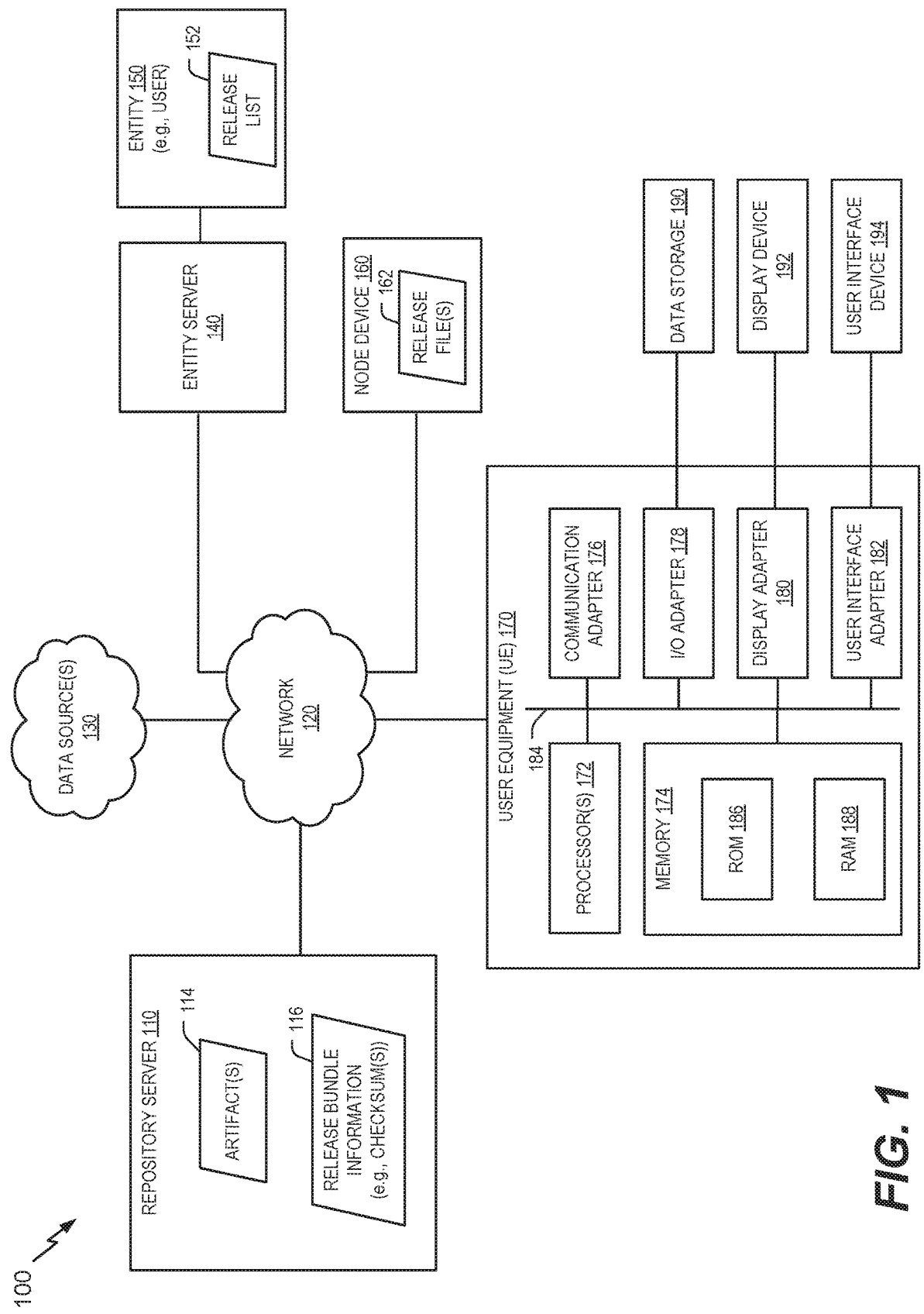
FIG. 1 is a block diagram of an example of a system that includes a server for distribution of a software release.

Inventive concepts utilize a system to distribute a software release. To illustrate, an entity or user may indicate one or more files for distribution as a software release to one or more devices (e.g., one or more node devices). For example, the one or more files may correspond to a build job for software (e.g., services, infrastructure, or a combination thereof) to be deployed to and/or updated at the one or more devices. Based on the one or more files, a release bundle may be generated that includes release bundle information. The release bundle information includes, for each file of the one or more files, a checksum, meta data, or both. In some implementations, the release bundle information may constitute a manifest of the one or more files to be distributed as the software release.

Embodiments also provide that, after generation of the release bundle, a signature may be attached to the release bundle to generate a signed release bundle that is immutable. In some implementations, the signature may be generated and/or attached based on private key corresponding to the entity or user.

In some embodiments, a release bundle transaction session may be initiated with each of one or more node devices and the signed release bundle (including the release bundle information) is sent to one or more node devices during the release bundle transaction session. A node device that receives the release bundle can identify a transaction directory, such as a portion of a memory, for receiving at least one file of the one or more files corresponding to the signed release bundle. In some implementations, after receiving the signed release bundle, the node device may verify a source of the signed release bundle and may identify the transaction directory after verification of the source. To illustrate, the node device may include a public key that corresponds to the private key of the entity or user and may verify the signature based on the public key. The node device may receive the at least one file (of the one or more files corresponding to the signed release bundle) and store the at least one file at the transaction directory. In some implementations, less than all of the one or more files corresponding to the software release may be received at the node device as a result of some of the one or more files already being present at the node device.

Embodiments also provide that the release bundle transaction session may be closed after verification, based on the signed release bundle information, that each of the one or more files is present/available at the node device. For example, to verify that each of the one or more files is present/available at the node device, the node device may generate a checksum for the at least one file in the transaction directory and verifies that the checksum matches a checksum included in the signed release bundle. In some implementations, after verification that each of the one or more files is present/available at the node device, the one or more files may be provided to a memory of a node device and meta data included in the signed release bundle information may be applied to the one or more files transferred to the memory.

The foregoing features provide a system for generation and/or use of a release bundle to efficiently, consistently, and securely distribute of software. This can be advantageous in a number of scenarios. For example, the release bundle including the release bundle information may be generated, transmitted, and/or stored to indicate one or more files of a software release, such as one or more files corresponding to multiple services, multiple applications, and/or multiple types of files. The release bundle provided to a node device may advantageously be used to identify/verify a source of the release bundle, identify/verify the one or more files, and arrange/assemble the one or more files. Additionally, or alternatively, one or more release bundles corresponding to software may be analyzed to troubleshoot an issue with the software and/or revert to a prior version of the software. In some implementations, the release bundle may be signed to render the release bundle immutable, thereby protecting the release bundle from tampering and increasing security of the software release. Additionally, or alternatively, prior to the release bundle being provided to the node device, each of the one or more files corresponding to the release bundle may be analyzed to determine whether or not the file poses a security risk or vulnerability and/or is compliant with one or more rules. Thus, the systems, methods, and computer-readable storage media of the present disclosure describe deploying software efficiently, consistently, and securely.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may comprise a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server for distribution of a software release is shown and designated 100. System 100 includes a server 110 (e.g., a repository server), a network 120, data sources 130, an entity server 140, an entity 150, a node device 160, and user equipment 170.

Server 110 may include one or more servers that, according to one implementation, are configured to perform several of the functions and/or operations described herein. One or more of the servers comprising server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components comprising user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, and/or node device. 160.

As shown, server 110 includes one or more artifacts 114 and release bundle information 116. Artifacts may include one or more binaries (e.g., a computer file that is not a text file). The artifacts may correspond to one or more package types. For example, a first artifact may correspond to a first package type, such as Maven, and a second artifact may correspond to a second package type, such as Bower. The release bundle information indicates a list of files (e.g., artifacts) to be included in the release bundle and meta data (e.g., properties) associated with the release bundle. The release bundle information may include, for each file of the bundle release, a checksum (of the file), meta data (corresponding to the file), or both. In some implementations, the release bundle also include additional meta data (e.g., file name, file size, path to the file, etc.) corresponding to the release bundle, such as a release bundle name, a version number, a source identifier, description information, release date, a size. Additionally, or alternatively, the release bundle information may include a signature (or other cryptography technique) to render the release bundle information immutable.

Network 120, such as a communication network, may facilitate communication of data between server 110 and other components, servers/processors, and/or devices. For example, network 120 may also facilitate communication of data between server 110 and one or more data sources 130, entity server 140, a node device 160, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. In some implementations, entity 150 includes or is configured to generate (or initiate generation of) a release list 152. Release list 152 corresponds to one or more files (e.g., artifacts) to be included in a software release. For example, release list 152 may correspond to a build job. In some implementation, entity 150 provides release list 152 to server 110 to cause server 110 to generate release bundle information 116. In other implementations, entity 150 provides a query and/or one or more parameters for a query which is performed by server 110 to generate release list 152 and/or release bundle information 116 at server 110. To illustrate, entity 150 initiate a query by server 110 to identify one or more files corresponding to a particular build job identifier and to generate corresponding release bundle information (e.g., 116).

Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as describer further herein at least with reference to FIG. 2. In such implementations, the first entity and the second entity may be the same entity (e.g., part of the same company) or may be different entities.

Node device 160 includes one or more release files 162. To illustrate, software (e.g., packages), such as the one or more release files 162, hosted at node device 160 may be part of a release bundle which is a secure and immutable collection of software packages that make up a release. In some implementations, the release files 162 include or correspond to release list 152, release bundle information 116, or both.

In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof in other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, supports the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 can comprise a server and/or cloud-based computing platform configured to perform operations and/or execute the steps described herein. Accordingly, server 110 may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 using a device via one or more networks, such as network 120, which itself can comprise one or more of a local intranet, a LAN (Local Area. Network), a WAN (Wide Area. Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
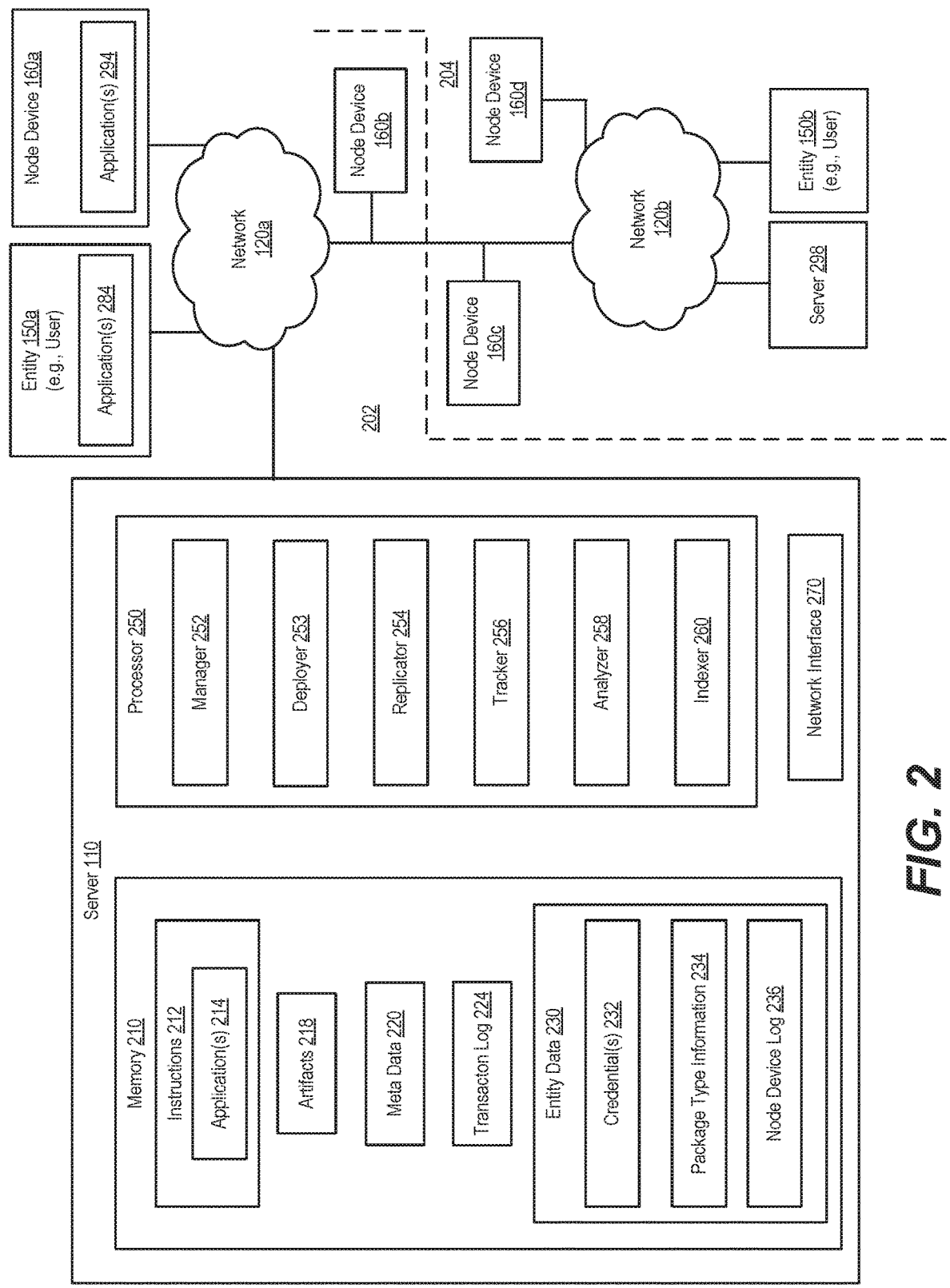
FIG. 2 is a block diagram of another example of a system for distribution of a software release.

Referring to FIG. 2, a block diagram of a system for distribution of a software release according to an embodiment is shown as a system 200. System 200 may include or correspond to at least a portion of system 100. System 200 includes server 110, networks 120a, 120b, entities 150a, 150b, node devices 160a, 160b, 160c, 160d, and a server 298. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 298 is included in second region 204. Server 298 may be a repository server and may include or correspond to server 110. In some implementations, server 110 and server 298 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 298), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, artifacts 218 (e.g., binaries), meta data 220, a transaction log 224, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores artifacts 218, meta data 220, transaction log 224, entity data, or any combination thereof. In some implementations, memory 210 may include or be coupled to cloud storage such that one or more of artifacts 218, meta data 220, transaction log 224, entity data is stored at a cloud storage location and accessible by server 110.

Artifacts 218 may include or correspond to artifacts 114. Meta data 220 may include meta data for artifacts 114, meta data for application 214, meta data for one or more release bundles (e.g., 116), or any combination thereof. Meta data for an artifact (e.g., 114) may include a file name, a file size, a checksum of the file, and/or one or more properties that annotate the artifact, such as when the artifact was created by a build, a build job name, an identifier of who initiate the build, a time the build was initiated, a build agent, a CI server, a build job number, a quality assurance test passed indicator, as illustrative, non-limiting examples.

Transaction log 224 may track one or more transactions such as storage, modification, and/or deletion of an artifact (e.g., 218), meta data (e.g., 220), release bundle information (e.g., 116), permissions, or any combination thereof. In some implementations, transaction log 224 may be utilized to maintain data consistency between servers in different regions, such as server 110 and server 298. To illustrate, in implementations where each server 110, 298 is to have the same set of artifacts (e.g., 218) and/or meta data (e.g., 220), the transaction log 224 provides an indication of what data (e.g., artifacts and/or meta data) needs to be up added, updated, and/or removed between the servers 110, 298.

Entity data 230 may include data associated with one or more entities. For example, entity data 230 may include or correspond to one or more of entity 150a, 150b. Entity data 230 may include one or more credentials 232, package type information 234, and a node device log 236. Credential 232 include login information to enable one or more users and/or one or more entities to access server 110. Additionally, or alternatively, credential 232 may include security or authentication information, such as a private key and/or public key of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, software information (e.g., name, version number, size, etc.) installed at one or more node devices, or any combination thereof, as illustrative, non-limiting examples.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may comprise a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may comprise a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts (e.g., 114). In some implementations, manager 252 may enable administration of multiple instances of a user account, such as a first instance at server 110 and a second instance at server 298. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. To illustrate, deployer 253 enables generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160a, 160b, 160c, 160d). In some implementations, as part of the release flow, release bundles are verified by the source destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution as described herein.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 298, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reducing network load and release bundle synchronization time from source device (e.g., server 110) to target instance (e.g., server 298) or node device (e.g., 160a, 160b, 160c, 160d). Additionally, or alternatively, replicator 254 may be configured to identify a difference between multiple files stored at a first device (e.g., server 110) and one or more files stored at a second device (e.g., server 298 or a node device), and initiate transfer of at least one file (e.g., less then all of the multiple files) to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160a, 160b, 160c, 160d. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160a, 160b, 160c, 160d.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
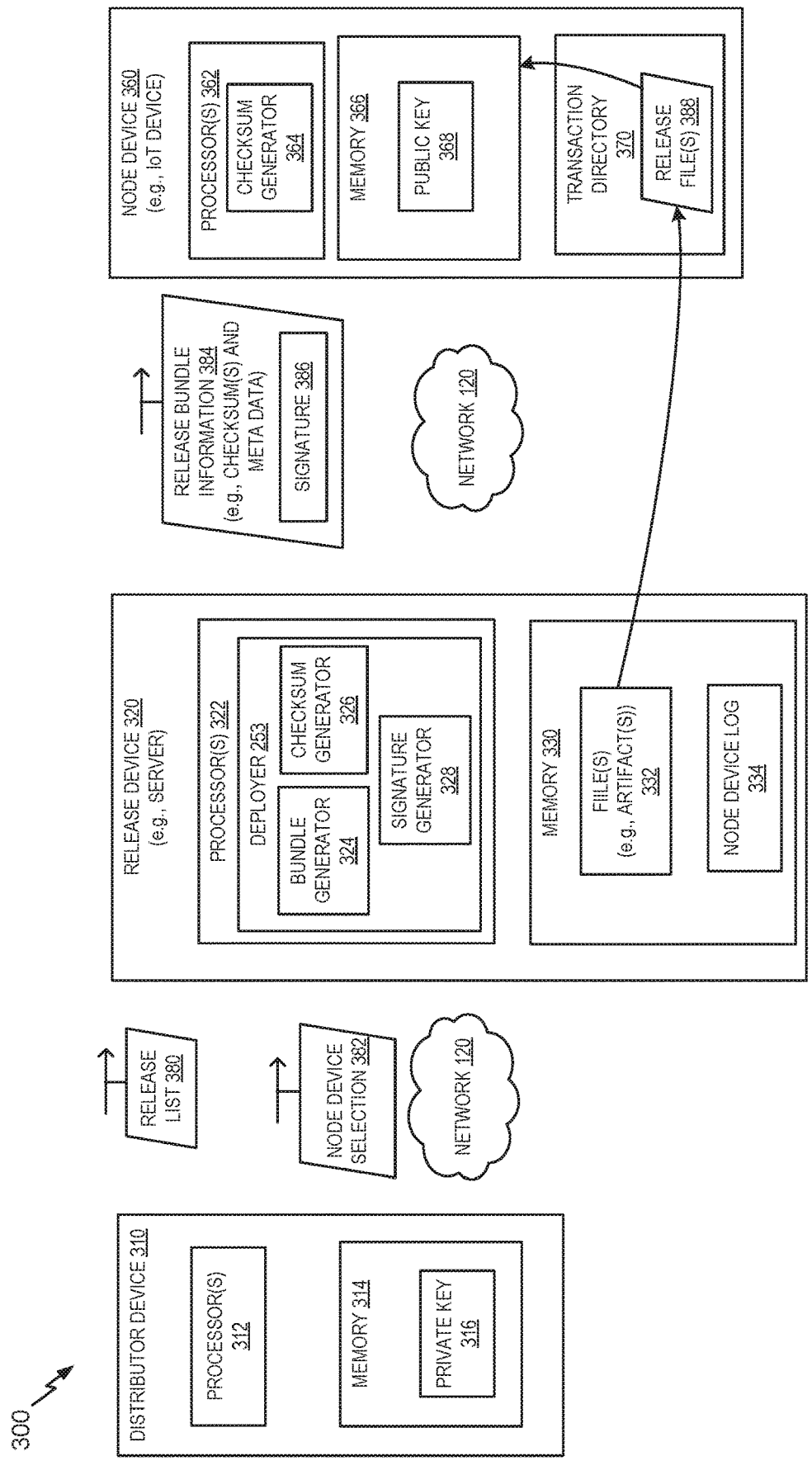
FIG. 3 is a block diagram of another example of a system for distributing a software release.

Referring to FIG. 3, a block diagram of a system for distribution of a software release is shown and designated 300. System 300 may include or correspond to at least a portion of system 100 and/or system 200. System 300 includes a distributor device 310, a release device 320, and a node device 360. Distributor device 310, release device 320, and node device 360 may be coupled via one or more networks, such as network 120. Distributor device 310 may include or correspond to entity server 140, entity 150, 150a, 150b, or any combination thereof. Release device 320 may include or correspond to server 110, server 298, or a combination thereof. Node device 360 may include or correspond to node device 160, 160a, 160b, 160c, 160d.

Distributor device 310 includes one or more processors 312 and a memory 314. Memory 314 includes a private key 316 that corresponds to a public key 368 that is provided to one or more node devices (e.g., 360). Additionally, memory 314 may include instructions (not shown) that are executable by processor 312 to cause processor 312 to perform one or more operations. In some implementations, the instructions may include or be arranged as an application, such as application 284 (e.g., a software program), associated with release device 320. Although system 300 is described as including one distributor device 310, in other implementations, system 300 may include multiple distributor devices (e.g., 310) coupled to release device 320.

Release device 320 includes one or more processors 322 and a memory 330. Memory 330 may include or correspond to memory 210. Memory 330 includes a one or more files 332 (e.g., artifacts) and a node device log 334. The one more files 332 may include or correspond to artifacts 114 and/or artifacts 218. Node device log 334 may include or correspond to node device log 236. Additionally, memory 330 may include instructions (not shown) that are executable by processor 322 to cause processor 322 to perform one or more operations. In some implementations, the instructions may include or be arranged as an application, such as application 214 (e.g., a software program).

As shown, processor 322 includes deployer 253. Deployer 253 includes a bundle generator 324, a checksum generator 326, and a signature generator 328. For example, each of bundle generator 324, checksum generator 326, and signature generator 328 may include or correspond to one or more modules or sub-modules. Although deployer 253 is described as including bundle generator 324, checksum generator 326, and signature generator 328, in other implementations, one or more of bundle generator 324, checksum generator 326, and signature generator 328 may be distinct from deployer 253.

Bundle generator 324 is configured to generate a release bundle and/or release bundle information, such as release bundle information 384. In some implementations, bundle generator 324 includes a bundle generator module that includes one or more routines, executable by one or more processors (e.g., the processor 172 of FIG. 1 or processor 250 of FIG. 2) or processor 322 to generate a release bundle and/or release bundle information (e.g., 384) as described herein.

Checksum generator 326 is configured to generate a checksum based on one or more files, meta data corresponding to the one or more files, or any combination thereof. In some implementations, checksum generator 326 includes a checksum generator module that includes one or more routines, executable by one or more processors (e.g., the processor 172 of FIG. 1 or processor 250 of FIG. 2) or processor 322 to generate a checksum based on one or more files, meta data corresponding to the one or more files, or any combination thereof.

Signature generator 328 is configured to generate a signature and/or encode a release bundle. In some implementations, signature generator 328 includes a signature generator module that includes one or more routines, executable by one or more processors (e.g., the processor 172 of FIG. 1 or processor 250 of FIG. 2) or processor 322 to generate a signature and/or encode a release bundle.

Although system 300 is described as including one release device 320, in other implementations, system 300 may include multiple release devices (e.g., 320) coupled to distributor device 310 and/or node device 360. Additionally, or alternatively, it is noted that release device 320 (e.g., processor 322) may include one or more additional components or modules, such as manager 252, replicator 254, tracker 256, analyzer 258, and/or indexer 260, as illustrative, non-limiting examples.

Node device 360 includes one or more processors 362, a memory 366 (e.g., one or more memories), and a transaction directory 370. Transaction directory 370 may include or correspond to a storage device configured to receive and store one or more files. In some implementations, transaction directory 370 is distinct from memory 366. In other implementations, transaction directory includes a logical or virtual portion of memory 366.

Memory 366 includes public key 368. Public key 368 may correspond to private key 316. Additionally, memory 366 may include instructions (not shown) that are executable by processor 362 to cause processor 362 to perform one or more operations. In some implementations, the instructions may include or be arranged as an application, such as application 294 (e.g., a software program). Additionally, or alternatively, memory 366 may include one or more files (e.g., software), such as software corresponding to a release bundle.

Processor 362 includes a checksum generator 364. Checksum generator 364 is configured to generate a checksum based on one or more files, meta data corresponding to the one or more files, or any combination thereof. In some implementations, checksum generator 364 includes a checksum generator module that includes one or more routines, executable by one or more processors (e.g., the processor 172 of FIG. 1) or processor 362 to generate a checksum based on one or more files, meta data corresponding to the one or more files, or any combination thereof.

Although system 300 is described as including one node device 360, in other implementations, system 300 may include multiple node devices (e.g., 360) coupled to release device 320. Additionally, or alternatively, it is noted that node device 360 (e.g., processor 362) may include one or more additional components or modules, such as manager 252 and/or replicator 254, as illustrative, non-limiting examples.

During operation of system 300, distributor device 310 (e.g., entity 150) may perform a build job to generate one or more files corresponding to a software release. The one or more files of the software release may be intended to be distributed to one or more node devices (e.g., 360). Distributor device 310 may imitate a distribution transaction and/or generation of a release bundle including release bundle information 384 by sending a release list 380 and/or a command to generate a release bundle. Although described as distributor device 310 sending release list 380, in other implementations, distributor device 310 may initiate a query at release device 320 to cause release device 320 to identify one or more artifacts for the release bundle. In a particular implementation, the query may include a domain specific Query Language for release device 320 that allows querying the different types of meta data stored at release device 320 (e.g., memory 210, 330) or accessible by processor 322. To illustrate, the query language query may be configured to search meta data corresponding to release device 320 to identify and retrieve one or more files to be included in the release bundle. For example, the query language query may indicate to retrieve files corresponding to a particular build job identifier. In some implementations, the query may include a name of the release bundle, a version of the release bundle, an automatic sign indicator to automatically sign the release bundle upon creation, a storage location from which to acquire one or more files (e.g., one or more artifacts), a description of the release bundle, release bundle notes for the version, or any combination thereof, as illustrative, non-limiting examples. Additionally, or alternatively, the query may be generated using a template provided by release device 320 in which distributor device 310 populates one or more fields of the template to generate the query. Alternatively, distributor device 310 may identify a previously generated release bundle and clone the previously generated release bundle. In some implementations, distributor device 310 may modify one or more aspects (e.g., one or more parameters) of the cloned release bundle, such as version number for the cloned release build, as an illustrative, non-limiting example.

In response to release list 380 (or a query), release device 320 may identify the one or more artifacts for the release bundle and generate the release bundle information 384. For example, bundle generator 324 may receive release list 380 and/or query results and generate release bundle information 384. For each file (e.g., artifact) indicated by release list 380 and/or the query results, checksum generator 326 may generate a corresponding checksum that is provided to bundle generator 324. In other implementations, the checksum for each file may have been previously generated and stored at memory 330 as meta data for the file. Bundle generator 324 may generate release bundle information 384 to include, for each file, a checksum and meta data (e.g., file name, size, path, etc.). In some implementations, the release bundle information may include meta data corresponding to the release bundle, such as a bundle name, a version number, a description, a release date, etc. in some such implementations, checksum generator 326 may generate a checksum value for an entirety (e.g., all of) the one or more files of the release bundle and the generated checksum may be included in the release bundle information.

In some implementations, release bundle information 384 may be made available to distributor device for review, modification, and/or approval. Additionally, or alternatively, release bundle information may be cryptographically signed to make release bundle information immutable. For example, signature generator 328 may generate signature 386 (e.g., perform asymmetric cryptography) that is applied to release bundle information 384. To illustrate, signature generator 328 may generate signature 386 based on private key 316. In some implementations, distributor device (e.g., entity 150) may select and/or provide the cryptographic scheme to be applied to release bundle information 384.

In addition to initiating generation of a release bundle (e.g., release bundle information 384), distributor device 310 may provide a node device selection 382 to release device 320. Node device selection may indicate one or more node devices, such as node device 360, to receive the release bundle. In some implementations, node device selection 382 may also indicate at least one distribution path for at least one node that indicates a path via which the release bundle (e.g., release bundle information 384 and/or one or more files) are to be provided to the at least one node device.

Release device 320 (e.g., deployer 353) may send release bundle information 384 to node device 360. Additionally, release device 320 may initiate sending one or more files (e.g., 332) of the release bundle to node device 360. Transmission of release bundle information 384 and/or one or more files to node device 360 may comprise a point-to-point transaction. In some implementations, release device 320 may send less than all of the files that correspond to the release bundle. To illustrate, node device 360 may provide or indicate one or more files present at node device 360, a most recent version of software to be update, an indication of at least one file not present at node device 360 (and indicated and/or identified by release bundle information), or a combination thereof. In such implementations, based on the information provided by node device 360, release device 320 may identify which files need to be provided to node device 360 such that node device 360 has all the files for the release bundle. In some implementations, one or more files may be transmitted together or separately, or a single file may be dividing into multiple portions that are transmitted separately. In implementations where release device 320 sends release bundle information 384 to multiple node devices, release device 320 may provide a first set of one or more files to a first node device such that that the first node device has all the files for the release bundle and may provide a second set of one or more files (different from the first set of one or more files) to a second node device such that that the second node device has all the files for the release bundle. In some Node device 360 receives release bundle information 384 and confirms a source of the release bundle information 384. To confirm the source, node device 360 may verify signature 386 using public key 368. If node device 360 does not confirm the source, the node device 360 discards the release bundle information 384 and does not accept one or more files received from release device 320 for storage in transaction directory 370. Alternatively, if node device 360 confirms the source, the node device 360 accepts one or more files received from release device 320 and stores the one or more files in transaction directory 370. To illustrate, based on confirmation/verification of the source, node device 360 receives and stores one or more release files 388 (corresponding to the bundle release) at transaction directory 370.

After receiving release files, node device 360 may verify that all files corresponding to the release bundle (e.g., release bundle information 384) have been received and/or are available to node device 360. For example, node device 360 may verify that each of one or more files corresponding to the signed release bundle information 384 is included in transaction directory 370. To illustrate, for each file (e.g., 388) included in transaction directory, checksum generator 364 may generate a corresponding checksum that is compared to the one or more checksums included in release bundle information 384. Additionally, or alternatively, checksum generator 364 may generate a checksum for an entirety (e.g., all) of the files as a single group and compare the generated checksum to a corresponding checksum included in the release bundle information. If the two checksums match, then node device 360 has verified that all of the one or more files corresponding to the release bundle are present/accessible to node device 360 and have been arranged in the correct order as specified/indicated by release bundle information 384.

If node device 360 identifies a checksum value that does not match a checksum value included in release bundle information 384, node device 360 determines that distribution of the release bundle has failed. In such implementations, node device 360 may notify release device and/or distributor device of the failure. Additionally, or alternatively, if less than all of the files needed in the transaction directory are present, node device 360 may send a notification/request to request retransmission (e.g., redistribution) of the file that is not present.

If all files are verified as being present/accessible to node device 360, node device 360 may send an acknowledgement to distributor device 310 and/or release device 320. Additionally, after verification that all files are present/accessible to node device 360, node device 360 may move all the files of the release bundle (e.g., 388) to memory 366 and apply meta data (from release bundle information 384 to the files. To illustrate, the move operation of the files may be a database transaction such that all of the files are moved to memory 366 or none of the files are moved to memory 366. In some implementation, upon a successful move operation, node device 360 sends an acknowledgment/notification to distributor device 310 and/or release device 320. Additionally, or alternatively, after verification that all files are present/accessible to node device 360, node device 360 may make the files available for download (to another device) via an API. In some such implementations, the files may be available for download from transaction directory 370 and/or may be moved to memory 366 and available for download from memory 366.

In some implementations, release device 320 may include analyzer 258. Analyzer 258 may be configured to analyze one or more files corresponding to the release bundle. In some implementations, in response to generation of release bundle information 384, analyzer 258 may receive release bundle information 384 and parse release bundle information 384 to identify one or more files of the release bundle. For each file, analyzer 258 may determine whether a vulnerability exists corresponding to the file, whether one or more usage rules (e.g., a license rule) are violated, etc. If an issue is identified, analyzer may initiate a notification and/or prohibit further processing/use of release bundle information 384. Additionally, or alternatively, analyzer 258 may review release bundle information 384 after release bundle information 384 is signed and/or after deployment of the release bundle corresponding to release bundle information 384. For example, release device 320 may store release bundle information 384 at memory 330 and analyzer 258 may analyze the stored release bundle information 384 to determine if a vulnerability exists with respect to the release bundle information. To illustrate, analyzer 258 may review the stored release bundle information periodically, based on identification of new vulnerability, based on identification of expiration of a licenses, or any combination thereof, as illustrative, non-limiting example.

In some implementations, distributor device 310 may generate and/or update node device log. Accordingly, node device log 334 may indicate a topology of one or more node devices (e.g., 360) corresponding to distributor device 310. In some implementations, node device log 334 may indicate a path to and/or an address of a node device, a most recently installed bundle provided to and/or stored at the node device, or both.

According to yet another embodiment, a system for distributing a software release is described. The system includes at least one memory storing instructions and one or more processors coupled to the at least one memory. The one or more processors are configured to execute the instructions to cause the one or more processors to receive an indication from a distributor device of one or more files for distribution. The one or more processors are further configured to execute the instructions to cause the processor to generate a bundle based on the one or more files, and attach a signature to the bundle to generate a signed bundle. The one or more processors can further be configured to receive a selection from the distribution device of one or more node devices to receive the signed bundle, and initiate transmission of the signed bundle to each of the one or more node devices.

In some implementations, the one or more processors are also configured to execute the instructions to cause the processor to generate the bundle comprising release bundle information generated based on the one or more files. For example, to generate the release bundle information, the one or more processors are further configured to execute the instructions to cause the processor to, for each file of the one or more files, generate a corresponding checksum. As another example, to generate the release bundle information, the one or more processors are further configured to execute the instructions to cause the one or more processors to, for an entirety of the one or more files, generate a checksum.

According to another embodiment, a computer program product is described that includes a computer-readable storage device, such as a non-transitory computer-readable storage medium, that includes instructions that, when executed by one or more processors, cause the one or more processors to perform operations for distributing a software release. The operations include executing a first routine to receive an indication from a distributor device of one or more files for distribution. The operations further include executing a second routine to generate a bundle based on the one or more files, the bundle including release bundle information generated based on the one or more files. The operations also include executing a third routine to attach a signature to the bundle to generate a signed bundle, executing a fourth routine to receive a selection from the distribution device of one or more node devices to receive the signed bundle, and executing a fifth routine to initiate transmission of the signed bundle to each of the one or more node devices.

In some implementations, a first node device of the one or more node devices comprises an Internet of things (IoT) device. Additionally, or alternatively, the signed bundle is immutable.

According to yet another embodiment, a system for receiving a software release is described. The system includes at least one memory storing instructions and one or more processors coupled to the at least one memory. The one or more processors are configured to execute the instructions to cause the processor to initiate a release bundle transaction session corresponding to a software release, and receive a bundle including release bundle information. The one or more processors are further configured to execute the instructions to cause the processor to verify a source of the release bundle information, and after verification of the source, identify a transaction directory. The one or more processors are also configured to execute the instructions to cause the processor to verify each of one or more files corresponding to the signed release bundle information is included in the transaction directory; and close the release bundle transaction session in response to verification, based on the signed release bundle information, that each of the one or more files is included in the transaction directory. In some such implementations, closure of the release bundle transaction in response to the verification makes the one or more files corresponding to the software release available for download via an application program interface (API). For example, the bundle files may be made available from the transaction directory (e.g., a temporary transaction directory), or may be stored from the transaction directory to another portion of a memory (or to a different memory) and made available from the other portion of the memory (or from the different memory).

In some implementations, the one or more processors are further configured to execute the instructions to cause the one or more processors to: identify a signature corresponding to the release bundle information, the signature generated based on a private key of a distributor device; access a public key from a memory of a node device; and decode the signature based on the public key. Additionally, or alternatively, the one or more processors are further configured to execute the instructions to cause the one or more processors to execute the one or more files.

According to another embodiment, a computer program product is described that includes a computer-readable storage device, such as a non-transitory computer-readable storage medium, includes instructions that, when executed by one or more processors, cause the one or more processors to perform operations for distributing a software release. The operations include executing a first routine to initiate a release bundle transaction session corresponding to a software release, and executing a second routine to receive a bundle including release bundle information. The operations further include executing a third routine to verify a source of the release bundle information, and executing a fourth routine to, after verification of the source, identify a transaction directory. The operations also include executing a fifth routine to verify each of one or more files corresponding to the signed release bundle information is included in the transaction directory, and executing a sixth routine to close the release bundle transaction session in response to verification, based on the signed release bundle information, that each of the one or more files is included in the transaction directory. In some such implementations, closure of the release bundle transaction in response to the verification makes the one or more files corresponding to the software release available for download via an application program interface (API).

In some implementations, the operations further include: in response to verification that each of the one or more files is include in the transaction directory, generating a checksum for the one or more files; and identifying a checksum included in the release bundle information. In some such implementations, the operations further include transferring of the one or more files from the transaction directory to a memory of a node device based on a match between the checksum for the one or more files and the checksum for the release bundle. Alternatively, the operations further include, in response to a determination that each of one or more files corresponding to the release bundle information is not included in the transaction directory, rejecting the software release.

Thus, system 300 describes generation and/or use of a release bundle, including release bundle information 384, to efficiently, consistently, and securely distribute of software.

For example, release bundle information 384 may be generated, transmitted, and/or stored to indicate one or more files (e.g., 322) of a software release, such as one or more files corresponding to multiple services, multiple applications, and/or multiple types of files. The release bundle (e.g., release bundle information 384 and one or more files) provided to node device 360 may advantageously be used to identify/verify a source of the release bundle, identify/verify the one or files, and arrange/assemble the one or more files. In some implementations, the release bundle may be signed (with signature 386) to render the release bundle immutable, thereby protecting the release bundle from tampering and increasing security of the software release. Additionally, or alternatively, prior to and/or after the release bundle being provided to the node device, each of the one or more files corresponding to the release bundle may be analyzed to determine whether or not the file poses a security risk or vulnerability and/or is compliant with one or more rules.

Referring to FIGS. 4A-4B and FIGS. 5A-5C, examples of different stages of a software release are shown. As described with reference to FIGS. 4A-4B and FIGS. 5A-5C, the different stages are described with reference to entity 150, server 110, and one or more node devices 160. Entity 150 may include or correspond to entity server 140, entity 150a, 150b, and/or distributor device 310. Server 110 may include or correspond to server 298 and/or release device 320. Node device 160 may include or correspond to node device 160a, 160b, 160c, 160d, and/or node device 360. As shown server 110 includes memory 210, manager 252, deployer 253, and replicator 254.

Figure 4A:
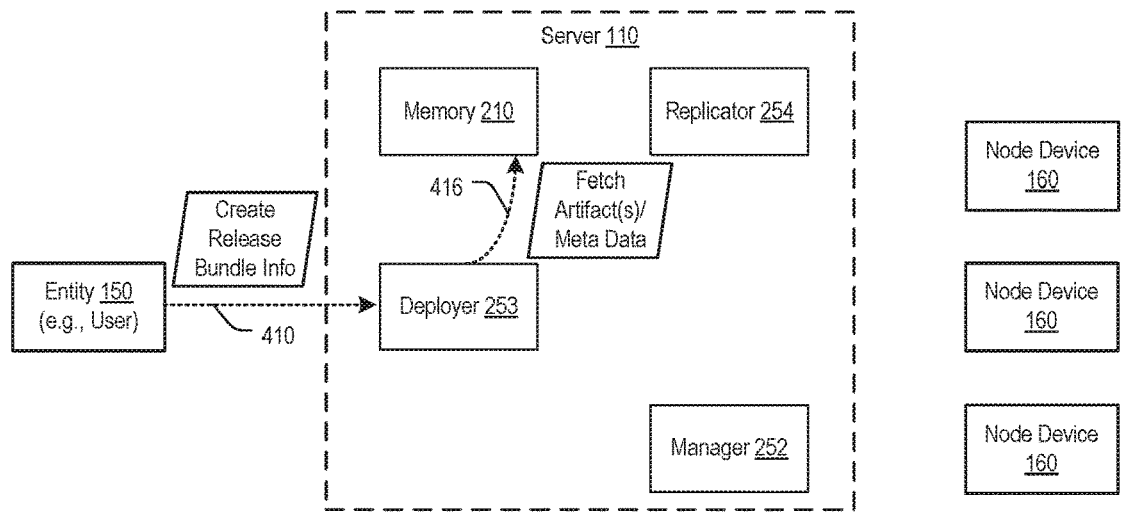
FIGS. 4A-4B illustrate an example of different stages of a software release distribution.

Referring to FIG. 4A, a creation stage is shown and designated 400. In FIG. 4A, entity 150 provides a create release bundle information command 410 and/or provides release bundle information to server 110 (e.g., to deployer 253). In some implantations, entity 150 sends a query to deployer 253 to cause deployer 253 to generate the release bundle information, such as release bundle information 116, 384. To illustrate, entity 150 may use an API call to create 410 and provide release bundle information. The command 410 may specify a variety of parameters including the files to be included in the release bundle and the different properties associated with the release bundle. The release bundle information includes a list of files (e.g., artifacts) to be included in the release bundle and meta data (e.g., properties) associated with the release bundle.

Responsive to receiving the command 410, deployer 253 fetches 416 one or more artifacts and meta data from memory 210 (such as by executing a query). For example, deployer 253 issues fetch commands to the memory 210 to retrieve the artifacts to be included in the release bundle, and the meta data associated with the artifacts. The meta data may include file names, file sizes, dates and times of storage, and/or other information associated with the artifacts (e.g., files).

Release bundles/release bundle information may be created and distributed from any server to which entity 150 is connected. Each release bundle may only contain artifacts from a single server. To create a release bundle/release bundle information, deployer 253 runs queries against memory 210 in order to retrieve the selected artifact references and properties. In a particular implementation, only those artifacts to which the triggering user has access can be collected into the release bundle. Deployer 253 generates release bundle information, which may include checksums for each artifact (e.g., file) in the release bundle as well as meta data for each artifact. The release bundle information may include or correspond to release bundle information 116, 384.

To prevent tampering with the release bundle, the release bundle may be signed, such as using a key (e.g., a GNU Privacy Guard (GPG) key, as a non-limiting example). The same key is then used by node device 160 to validate the release bundle before it is accepted. Alternatively, the signature may be performed using distributed keys (e.g., a private key and a public key). One a release bundle is signed, the release bundle is immutable (e.g., not changeable), and any file (e.g., artifact) included in a release bundle cannot be deleted from memory 210.

In some implementations, command 410 may be provided using the API call. Additionally, or alternatively, command 410 can be provided using a graphical user interface. A GUI for creating a release bundle is further described with reference to FIGS. 10A-10B. In some implementations, providing command 410 requires release bundle write permissions. Regardless of how the release bundle is initiated/created, the artifacts to be included in the release bundle are specified through a set of queries that can be defined by a user. A GUI for creating queries is further described with reference to FIGS. 11A-11D. When creating a release bundle, artifact properties are fetched from memory 210 into the release bundle. Additional custom properties can be added during the initial release bundle version creation. These additional properties can transferred to node device 160 as part of the distribution process.

Figure 4B:
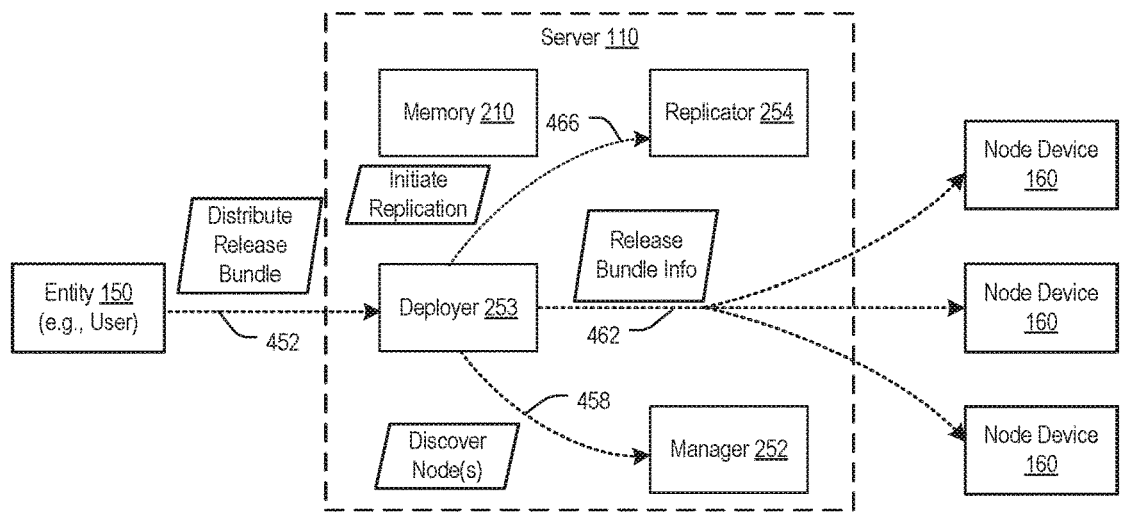

Referring to FIG. 4B, a distribution stage is shown and designated 450. In FIG. 413, entity 150 provides a distribute release bundle command 452 to server 110 (e.g., to deployer 253). In a particular implementation, entity 150 provides command 452 via a Distribute Release Bundle REST API endpoint corresponding to deployer 253. In some implementations, command 452 may include or identify one or more node devices to receive the release bundle.

Responsive to command 452, deployer 253 discovers 458 one or more node devices to which the release bundle is to be distributed. For example, deployer 253 may query manager 252 for a list of node devices and/or node device locations/addresses. The one or more node devices may have been selected by a user and communicated from entity 150 to manager 252. After generating the release bundle information, deployer 253 transmits 462 the release bundle information to node devices 160 (e.g., the node devices). The release bundle information enables node devices 160 to determine whether the respective node device 160 already stores all of the artifacts in the release bundle. For example, each node device 160 may generate checksums for artifacts in the latest release bundle stored at the node device 160 and compare the generated checksums to the checksums received from deployer 253. If each checksum received from deployer 253 matches a generated checksum at node device 160, then node device 160 already stores all the artifacts in the release bundle. However, if at least one checksum received from deployer 253 does not match a generated checksum, then node device 160 is missing at least one artifact of the release bundle.

After transmitting 462 the release bundle information, deployer 253 initiates 466 replication with replicator 254. For example, initiating replication may cause replicator 254 to replicate one or more of the artifacts (e.g., files) in the release bundle for distribution to node devices 160. In some implementations, deployer 253 provides the artifacts to replicator 254 for replication. In other implementations, deployer 253 provides identification of the artifacts, and replicator 254 retrieves the artifacts from memory 210. In some implementations, replicator 254 replicates and/or distributes all the artifacts in the release bundle for distribution. In other implementations, node devices 160 determine which artifacts are not stored at node devices 160 and transmit this information to server 110. Based on this information, replicator 254 only replicates and/or distributes the artifacts needed by node devices 160 (instead of replicating all the artifacts in the release bundle).

Figure 5A:
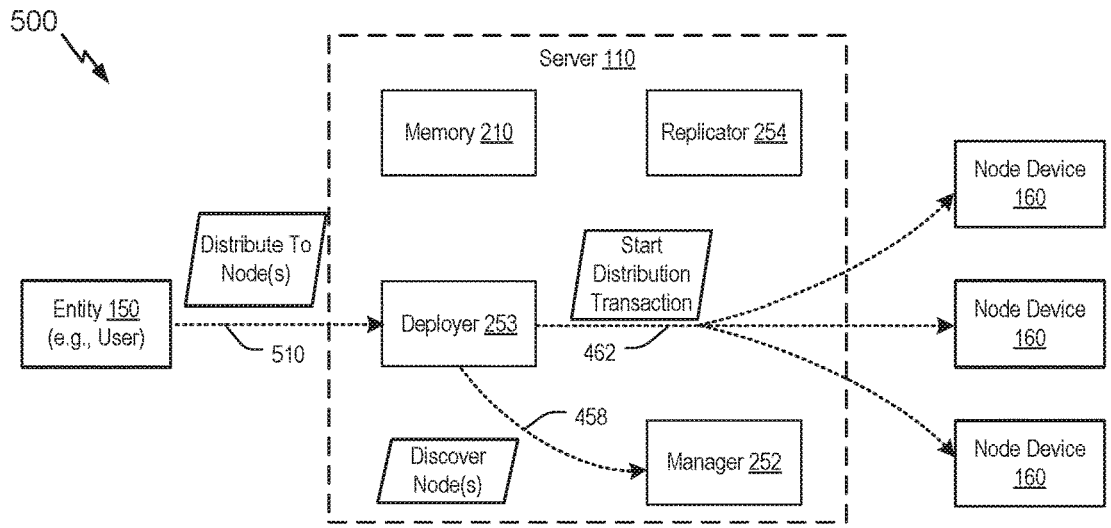
FIGS. 5A-5C illustrate another example of different stages of a software release distribution.
Figure 5B:
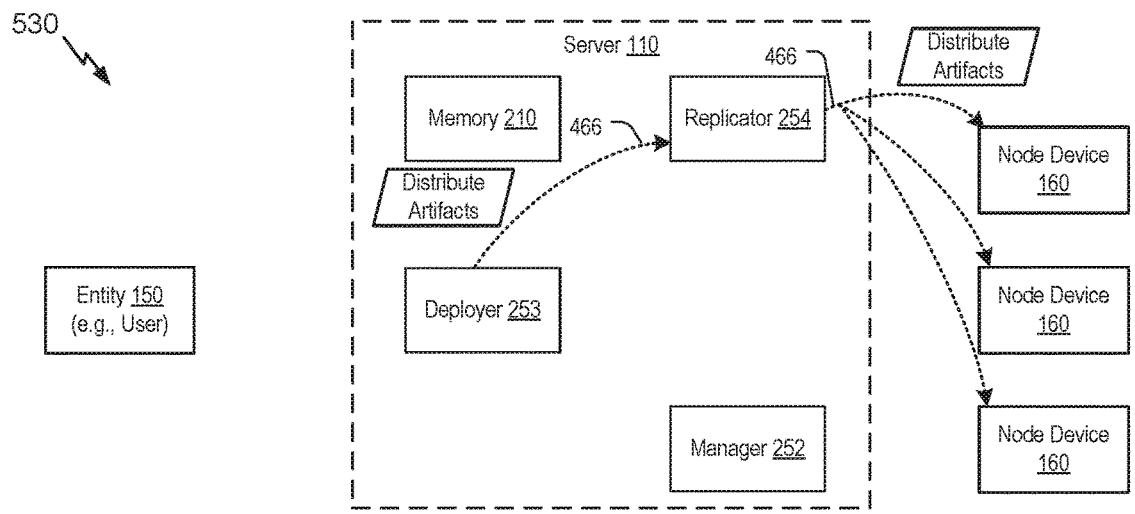
Figure 5C:
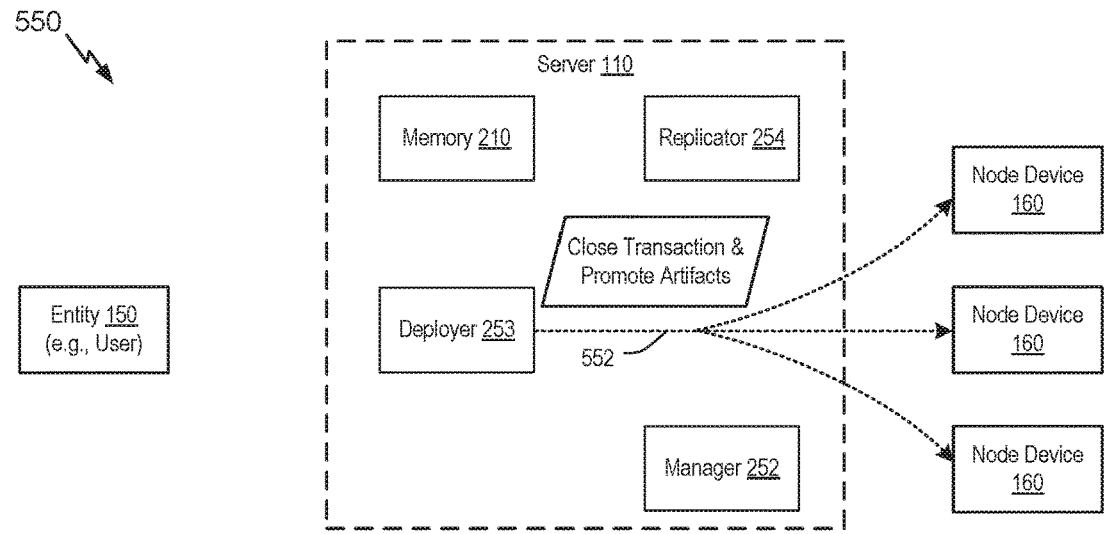

Referring to FIGS. 5A-5C, different stages of the distribution stage 450 of FIG. 4B are shown. For example, referring to FIG. 5A, a first stage is shown and designated 500. In first stage 500, entity 150 initiates distribution 510 to nodes by sending a command or instruction to server 110 (e.g., to deployer 253). The command or instruction includes information on the nodes to which the release bundle is to be distributed. Responsive to initiation of distribution 510, deployer 253 discovers 458 information about the nodes. For example, deployer 253 communicates with manager 252 to determine information, such as location information, addresses, etc., of the node devices.

After obtaining the information associated with the node devices, deployer 253 starts the distribution transaction 462 and transmits the release bundle information to node devices 160 (e.g., the node devices). In some implementations, starting the distribution transaction with the node devices 160 includes initiating a communication session between server 110 and node devices 160. The release bundle information may include checksums and meta data associated with the artifacts files) in the release bundle to be distributed, as well as a signature used to sign the release bundle. Providing the signature enables node devices 160 to validate the authenticity of the bundle as a whole. In some implementations, the release bundle information (or a signature attached to the release bundle information) may be encrypted by a private key, and node devices 160 may store a public key that enables decryption and/or validation of the release bundle information (or the signature). A GUI that enables a user to perform the distribution process is described further herein with reference to FIGS. 15A-15B.

Referring to FIG. 5B, a second stage is shown and designated 530. In second stage 530, deployer 253 initiates 466 replication (e.g., the distribution of artifacts) by sending a command or instruction to replicator 254. In some implementations, deployer 253 provides the artifacts and meta data to replicator 254. In other implementations, replicator 254 retrieves the artifacts and meta data from memory 210. Replicator 254 replicates the artifacts and distributes them to node devices 160. In some implementations, replicator 254 replicates all the artifacts in the release bundle and provides all the replicated artifacts to each of the node devices 108 (or to another device, such as a server) that serves the node devices 108. In other implementations, node devices 160 compare the release bundle information to information (e.g., checksums) generated at node devices 160 to determine which artifacts each node device 160 is missing. Node devices 160 provide information on missing artifacts to server 110 (e.g., to replicator 254). Based on this information, replicator 254 only replicates artifacts that are needed by node devices 160.

Referring to FIG. 5C, a third stage is shown and designated 550. In third stage 550, server 110/deployer 253 closes 552 one or more distribution transactions. For example, deployer 253 may notify node devices 160 that the transaction is complete and/or terminates the communication session(s). In some implementations, the transaction(s) may be closed responsive to node devices 160 validating the integrity of the transferred files by authenticating the release bundle (e.g., using a key) and/or by computing checksums of the received files and comparing the computed checksums to the checksums received in the release bundle information. If the files are verified, the files removed from transaction directory 370 and are stored (e.g., hosted) in a particular storage location (e.g., memory 366) of node devices 160, as described with reference to FIG. 3. In some such implementations, the bundle files available for download from the particular storage location (and/or from transaction directory 370) via an API. To illustrate, the bundle files may be made available after verification and/or after closure of the communications session. Additionally, in some such implementations.

Thus, FIGS. 4A-4B and 5A-5C illustrate examples of stages of creation and distribution of a release bundle. In this manner, entity 150 is able, using a few commands, to initiate distribution of a release bundle (e.g., a collection of files) to one or more node devices 160 without directly transferring each file from entity 150 to node devices 160.

Figure 6:
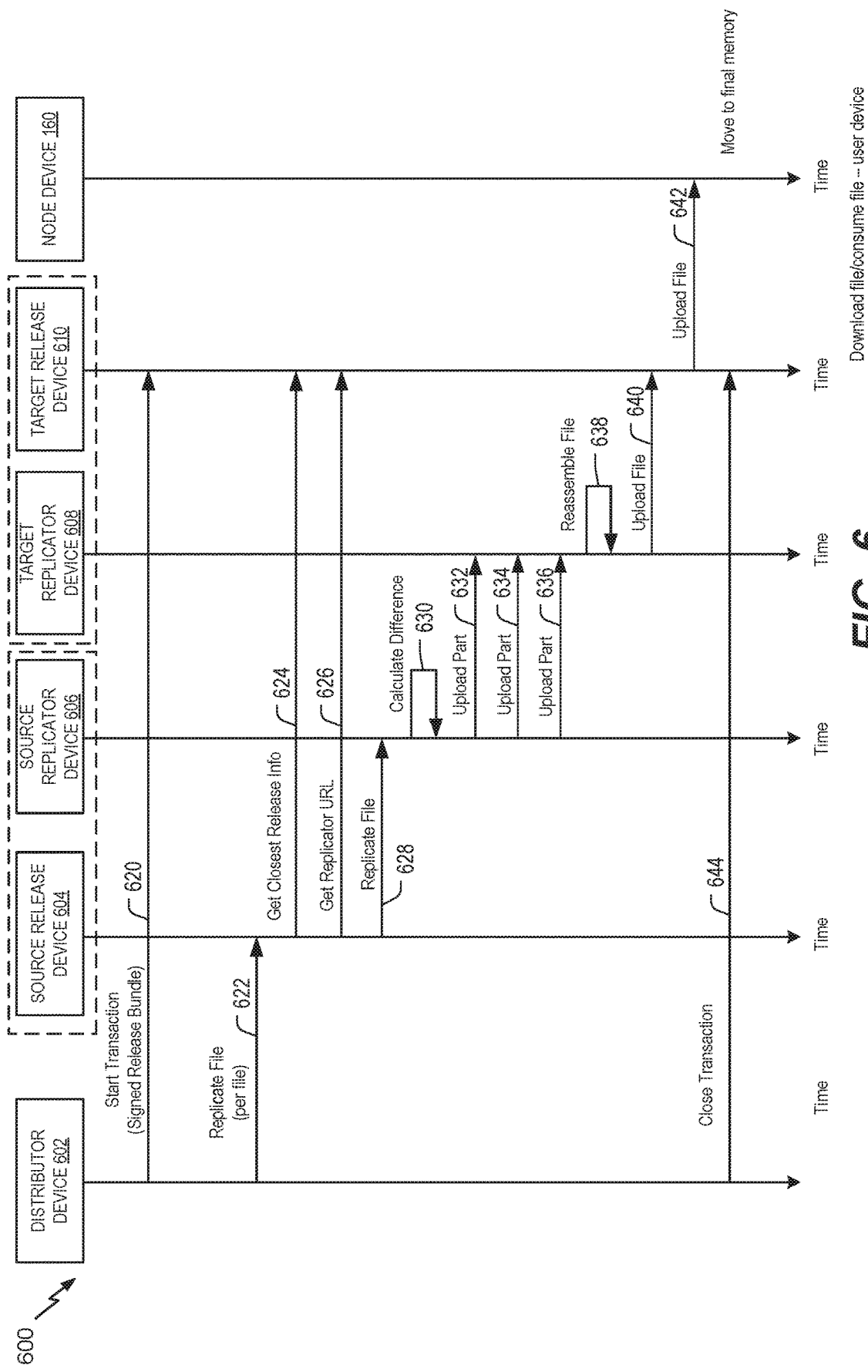
FIG. 6 is a ladder diagram to illustrate an example of a distribution transaction for a release bundle.

Referring to FIG. 6, a ladder diagram illustrating an example of a distribution transaction for a release bundle is depicted and generally designated 600. For example, the ladder diagram 600 depicts an example to illustrate distribution of a signed release bundle/signed release bundle information. The ladder diagram 600 includes or corresponds to system 100, 200, 300. As shown, a system of ladder diagram 600 includes a distributor device 602, a source release device 604, a source replicator device 606, a target replicator device 608, a target release device 610, and a node device 160.

In a particular implementation, some of the components 602-610 may be included in (or have the operations performed by) entity 150, 150a, 150b (e.g., distributor device 310), server 110, 298 (e.g., release device 320), node device 160, 160a, 160b, 160c, 160d, 360, and/or an intermediate receiving device (e.g., a second provider server or a customer server). For example, distributor device 602 may include or correspond to entity 150, 150a, 150b and/or distributor device 310. Source release device 604 and source replicator device 606 may include or correspond to server 110, 298 and/or release device 320. To illustrate, source release device 604 may include or correspond to manager 252 and/or deployer 253 and source replicator device 606 may include or correspond to replicator 254. Target replicator device 608 and target release device 610 may correspond to one or more other devices, such as another server (which includes a replicator and, optionally, a deployer). In an alternate implementation, target replicator device 608 and target release device 610 are incorporated in node device 160, 160a, 160b, 160c, 160d, 360 (e.g., as modules or instructions executed by a processor of node device 160). In some implementations, distributor device 602 may generate and display a GUI to enable a user to initiate or perform some of the operations described herein. Examples of one or more GUIs are described further herein at least with reference to FIGS. 10A-10B, 11A-11D, 12A-12G, 13A-13B, 14, 15A-15B, 16A-16B, 17A-17B, 18, and 19A-19C.

During operation, at 620, distributor device 602 starts a distribution transaction with target release device 610. Distributor device 602 may start the transaction by initiating a release bundle distribution with source release device 604, and source release device 604 may initiate a communication session with target release device 610 (or the device that includes target release device 610). For example, distributor device 602 may provide command 410, as described with reference to FIG. 4A.

Distributor device 602 initiates replication of the files corresponding to the release bundle, at 622. Responsive to the initiation, source release device 604 may fetch 416 the artifacts and meta data from memory, as described with reference to FIG. 4A, and retrieve information regarding the node devices, such as discovering 458 node devices, as described with reference to FIG. 4B. Source release device 604 may also generate release bundle information (e.g., checksums and meta data) for the artifacts in the release bundle.

Source release device 604 gets closest release information from target release device 610, at 624. For example, source release device 604 may transmit 462 the release bundle information to target release device 610, as described with reference to FIGS. 4B and 5A. The release bundle information may include checksums and meta data associated with the artifacts (e.g., files) in the release bundle. Target release device 610 may receive the release bundle information and generate checksums based on artifacts (e.g., files) stored at target release device 610 (or at node device 160). Target release device 610 may compare the generated checksums to the received checksums to determine if any of the artifacts of the release bundle are not stored at target release device 610 (or at node device 160). In some implementations, responsive to a get request, target release device 610 obtains bundle request information for a most recent bundle release received at target release device 610 (e.g., node device 160) and sends the most recent bundle request information to source release device 604 (e.g., source replicator device 606). In some implementations, source release device 604 receives the most recent bundle release information from target release device 610 and provides the most recent bundle release information to source replicator device 606.

Source release device 605 gets a replicator uniform resource locator (URL), at 626. The replicator URL may indicate a location/address of target replicator device 608 corresponding to target release device 610 (e.g., node device 160). For example, responsive to a get replicator URL request, the replicator URL may be provided to source release device 604. In some implementations, source release device 604 receives the replicator URL (of target replicator device 608) from target release device 610 and provides the replicator URL to source replicator device 606.

Source release device 604 replicates the files in the release bundle, at 628. For example, source release device 604 may initiate 466 replication, as described with reference to FIGS. 4B and 5B. Source replicator device 606 calculates a difference between the replicated artifacts and the artifacts stored at target release device 610 (or node device 160), at 630. For example, source replicator device 606 may compare the release bundle information (for the distribution transaction) and the most recent bundle release information (received from target release device 610). Calculating the difference includes determining which artifacts in the release bundle are not currently stored at target release device 610 (or node device 160). After determining the list of missing artifacts, source replicator device 606 uploads the missing parts (e.g., artifacts) to target replicator device 608 at 632, 634, and 636. As an illustrative example, three parts (e.g., one or more artifacts) are uploaded. In other implementations, more than three or fewer than three parts can be uploaded. In some implementations, at least one part of 632, 634, 636 includes multiple artifacts.

Target replicator device 608 reassembles the file, at 638. For example, target replicator device 608 combines the uploaded artifacts with the artifacts already stored at target release device 610 (or node device 160) to recreate the release bundle. To illustrate, target replicator device 608 may assemble the artifacts based on release bundle information (for the distribution transaction). In this manner, only the artifacts that are not already stored are transmitted between devices, thus reducing network bandwidth requirements.

After the release bundle is assembled, target replicator device 608 uploads the file to target release device 610, at 640. In some such implementations, target replicator device 608 may assemble the artifacts based on release bundle information (for the distribution transaction) and verify that all artifacts are present. Based on verification, the artifacts may be uploaded to target release device 610 and made available for down load via an API. To illustrate, target release device 610 may receive an request (e.g., an API request) from node device 160 such that the artifacts are downloaded to node device 160 from target release device 610. In such implementations, artifacts may be temporarily stored at target replicator device 608 and, based on verification, may be moved to another storage location/device corresponding to target release device.

Target release device 610 uploads the release bundle to node device 160 at 642. As the release bundle is received at node device 160, it may be stored in temporary storage, such as transaction directory 370 (e.g., temporary transaction directory). After the full file is received, and optionally verified, the file may be moved to memory 366.

After distribution is complete, distributor device 602 closes the transaction, at 644. For example, distributor device 602 may cause source release device 604 to close 552 (e.g., terminate) a communication session, as described with reference to FIG. 5C.

Thus, FIG. 6 demonstrates how distribution of a release bundle occurs between distributor device 602, source release device 604, source replicator device 606, target replicator device 608, target release device 610, and node device 160. In the implementation illustrated in FIG. 6, only artifacts that are not already stored at target release device 610 (or node device 160) are transmitted between devices (e.g., via a network), which reduces network bandwidth usage as compared to transmitting an entirety of the release bundle. In other implementations, an entirety of the release bundle can be transmitted to improve to reduce complexity of the replicator devices.

Figure 7:
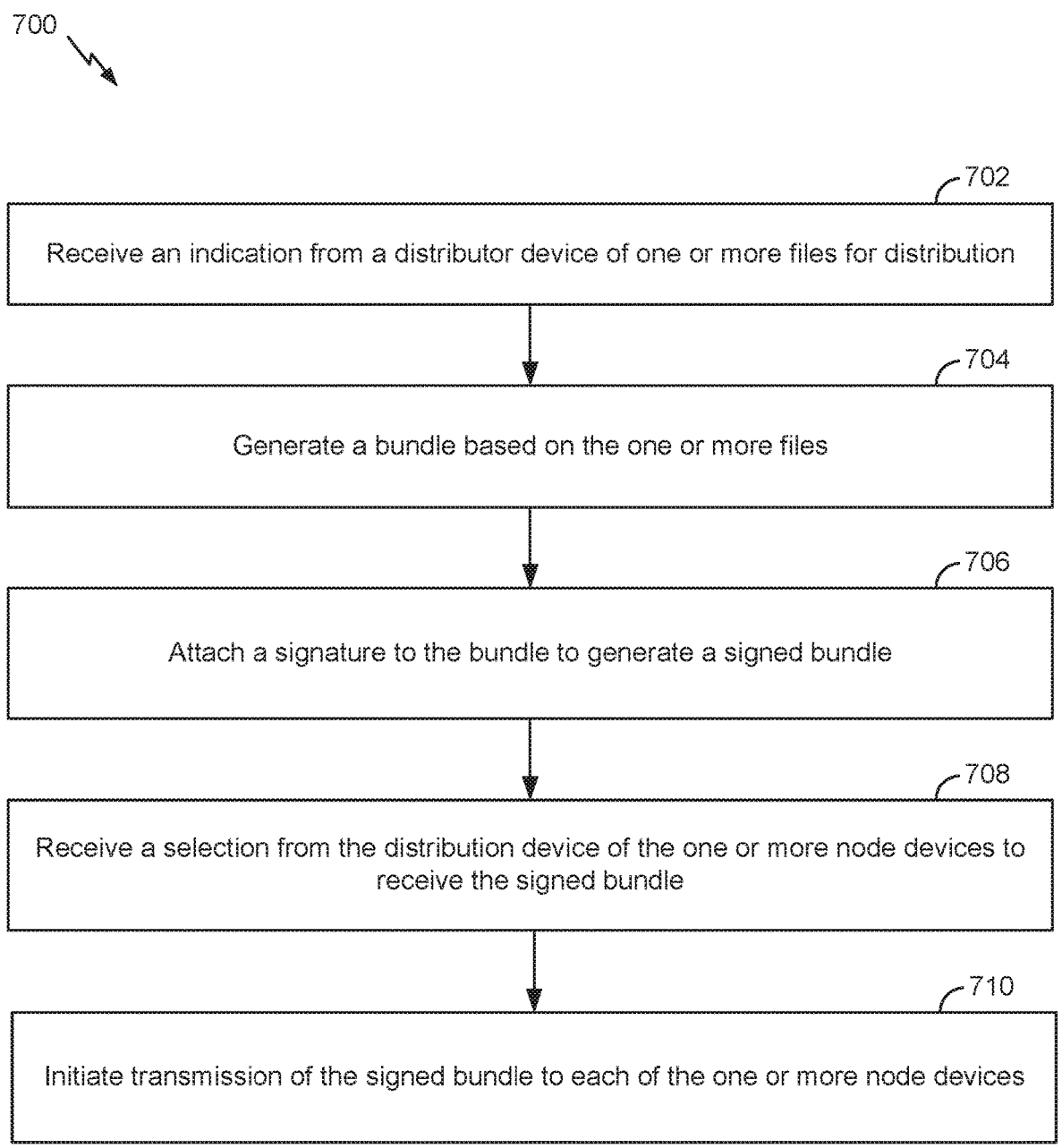
FIG. 7 is a flow diagram of an example of a method for distributing a software release.
Figure 8:
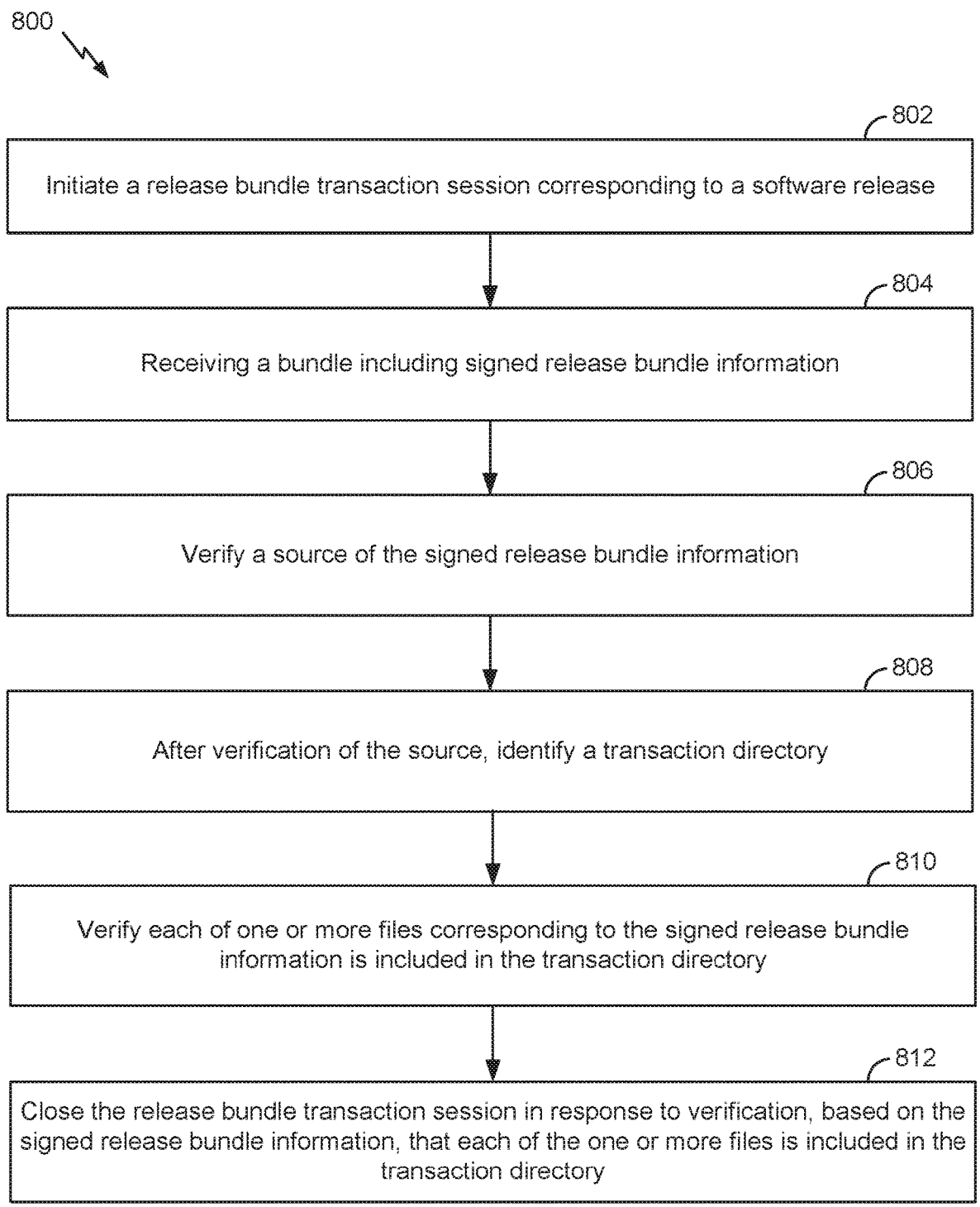
FIG. 8 is a flow diagram of an example of a method for receiving a software release.
Figure 9:
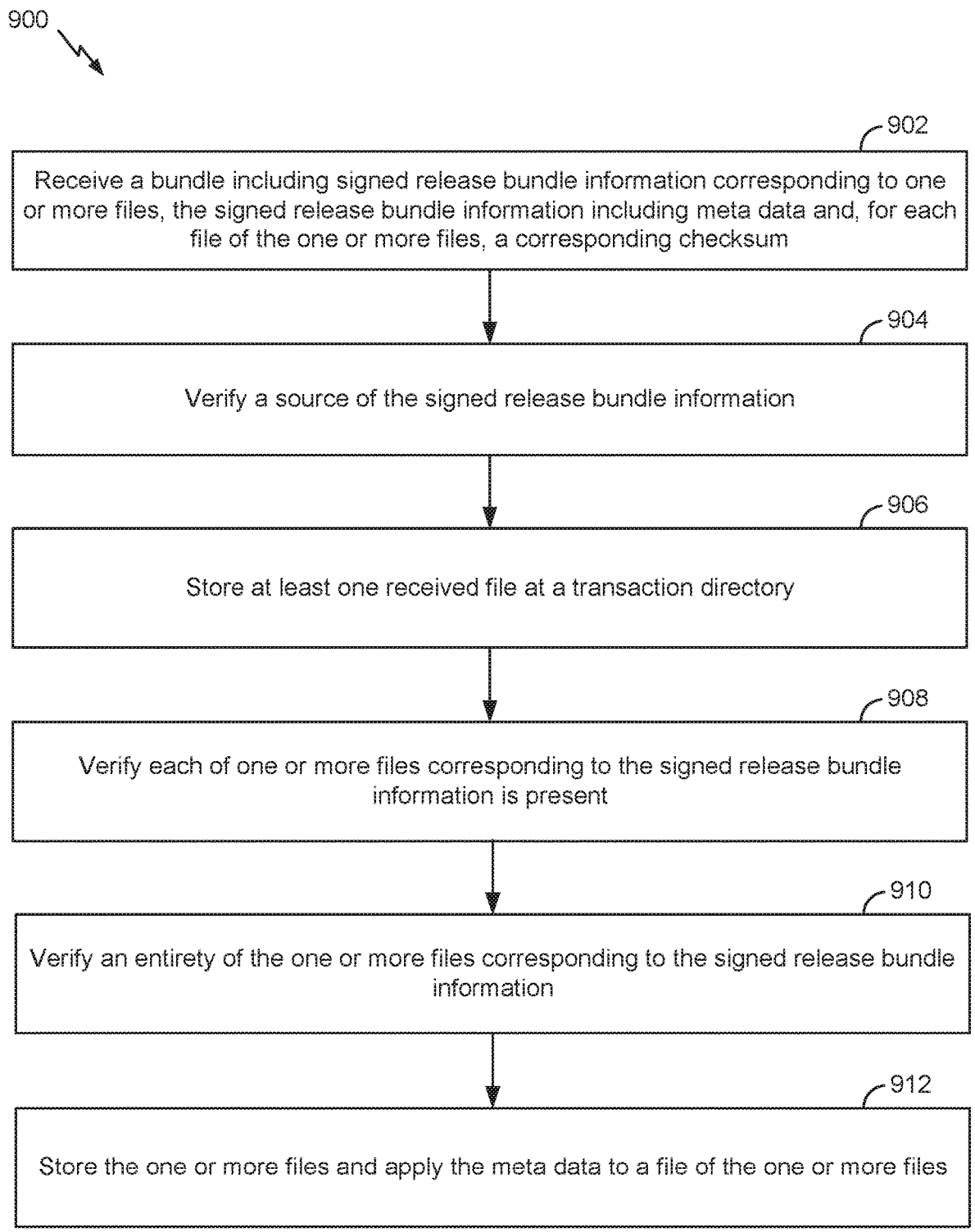
FIG. 9 is a flow diagram of another example of a method for receiving a software release.

FIGS. 7-9 are flow diagrams of methods of distributing and receiving a software release. Each of the methods of FIGS. 7-9 may be stored in a computer-readable storage medium as instructions that, when executed by one or more processors, cause the one or more processors to perform the operations of the method (e.g., 700, 800, 900). In some such implementations, method(s) also includes generating one or more graphical user interfaces (GUIs) via which the first inquiry set is uploaded, the result of the modeling is displayed, the input to initiate mapping the response is received, or a combination thereof.

Referring to FIG. 7, a flow diagram of a method for distributing a software release according to an embodiment is shown as a method 700. In a particular implementation, method 700 may be performed by server 110, 298 (e.g., one or more processors 250, 322, deployer 253 and/or replicator 254), release device 320, source release device 604, and/or source replicator device 606.

At 702, method 700 includes receiving an indication from a distributor device of one or more files for distribution. For example, the distributor device may include or correspond to entity server 140, entity 150, 150a, 150b, distributor device 310, or distributor device 602. The one or more files may include or correspond to artifact(s) 114, release file(s) 162, artifacts 218, meta data 220, files(s) 332, and/or release file(s) 388.

At 704, method 700 includes generating a bundle based on the one or more files. The bundle includes release bundle information generated based on the one or more files. For example, the bundle may include the one or more files and the release bundle information. The release bundle information may include or correspond to release bundle information 114, 384.

At 706, method 700 includes attaching a signature to the bundle to generate a signed bundle. For example, the signature may include signature 386. In a particular implementation, the signed bundle is immutable.

At 708, method 700 includes receiving a selection from the distribution device of one or more node devices to receive the signed bundle. For example, the one or more node devices may include or correspond to node device 160, 160*a*, 160*b*, 160*c*, 160*d*, 360. In a particular implementation, a first node device of the one or more node devices includes an Internet of things (IoT) device. At 710, method 700 includes initiating transmission of the signed bundle to each of the one or more node devices.

In a particular implementation, method 700 includes receiving a list of release updates from the distributor device. The list of release updates corresponds to the one or more files. For example, the list may include or correspond to release list 152 or release list 380. In this implementation, method 700 also includes identifying the one or more files based on the list of release updates and accessing each of the one or more files. Alternatively, receiving the list may include receiving one or more parameters for a query and/or initiating a query to generate the release list.

In some implementations, generating the bundle includes generating the release bundle information based on the one or more files. Additionally, or alternatively, the one or more files include one or more parts. In this implementation, generating the release bundle information includes, for each part of the one or more parts, generating a checksum and/or generating a bundle checksum for an entirety of the one or more or more files. In this implementation, the release bundle information does not include the one or more files.

In a particular implementation, method 700 includes generating the signature based on a private key corresponding to the distributor device, Additionally, or alternatively, method 700 may include verifying that the signed bundle is transmitted to (was received at) the one or more node devices. In some such implementations, verifying that the signed bundled includes receiving an acknowledgement from the target device (e.g., the node device). If an acknowledgment is not received, method 700 may include retransmitting at least one file of the one or more files, such as after expiration of a time period. In a particular implementation, method 700 includes receiving a notification of at least one file that has not been received at a transaction directory, and retransmitting the at least one file.

In a particular implementation, method 700 includes, based on input received from the distributor device, replacing, at least one file of the one or more files with a different file. The bundle is generated based on the different file. Additionally, or alternatively, method 700 may include receiving distribution parameters from the distribution device. The distribution parameters may include a date, a time, or both, corresponding to the transmission of the signed bundle.

In a particular implementation, method 700 includes receiving a request to initiate a distribution transaction session from the distribution device and initiating presentation at the distribution device of a user interface for the distribution transaction session. In this implementation, method 700 also includes receiving a transmission request from the distribution device to distribute the signed bundle to the one or more node devices and, after verification that the signed bundle is transmitted to the one or more node devices and each of the one or more files are present at the one or more node devices, closing the distribution transaction session.

Thus, method 700 describes distribution of a release bundle (e.g., release bundle information) to efficiently, consistently, and securely distribute of software. For example, the release bundle including the release bundle information may be generated, transmitted, and/or stored to indicate one or more files of a software release, such as one or more files corresponding to multiple services, multiple applications, and/or multiple types of files. Additionally, the release bundle provided to a node device may advantageously be used to identify/verify a source of the release bundle, identify/verify the one or files, and arrange/assemble the one or more files. In some implementations, the release bundle may be signed to render the release bundle immutable, thereby protecting the release bundle from tampering and increasing security of the software release. Additionally, or alternatively, one or more release bundles corresponding to software may be analyzed to troubleshoot an issue with the software and/or revert to a prior version of the software.

Referring FIG. 8, a flow diagram of a method for receiving a software release according to an embodiment is shown as a method 800. In a particular implementation, method 800 may be performed by server 110, 298 (e.g., one or more processors 250, 322, deployer 253 and/or replicator 254), node device 160, 160*a*, 160*b*, 160*c*, 160*d*, target replicator device 608, and/or target release device 610.

At 802, method 800 includes initiating a release bundle transaction session corresponding to a software release. For example, the release bundle transaction session may be initiated between the node device and entity 150, distributor device 310, 602, server 110, 298 (e.g., one or more processors 250, 322, deployer 253 and/or replicator 254), release device 320, source release device 604, and/or source replicator device 606.

At 804, method 800 includes receiving a bundle including signed release bundle information. For example, the signed release bundle information may include or correspond to release bundle information 114, 384. In some implementations, the signed release bundle information may include a signature (e.g., 386), such as a signature based on a private key (e.g., 316).

At 806, method 800 includes verifying a source of the signed release bundle information. For example, verifying the source may include verifying the signature using a private key (e.g., 368), which corresponds to the private key (e.g., 316) used to generate the signature. At 808, method 800 includes, after verification of the source, identifying a transaction directory. For example, the transaction directory may include or correspond to transaction directory 370. To further illustrate, in some implementations, the signed release bundle information includes, for each of the one or more files, a checksum and metadata corresponding to the file. In these implementations, verifying the source of the signed release bundle information includes identifying a signature corresponding to the signed release bundle information. The signature is generated based on a private key of a distributor device. Verifying the source of the signed release bundle information also includes accessing a public key from a memory of a node device. The public key corresponds to the private key. Verifying the source of the signed release bundle information further includes decoding the signature based on the public key.

At 810, method 800 includes verifying each of one or more files corresponding to the signed release bundle information is included in the transaction directory. For example, verifying each of the one or more files included in the transaction directly may include generating a corresponding checksum for each file and determining whether the checksum matches a checksum included in the signed release bundle information. In some implementations, when at least one file of the one or more files is present (e.g., a node device 160, 360 or target release device 610), a number of files needed to be included in the transaction directory is fewer than all of the one or more files are received. In such implementations, verifying includes verifying (generating a checksum and comparing the signed release bundle information) each file of the number of files needed in the transaction directory has been received and is present in the transaction directory. Additionally, in such implementations, verifying may include verifying that the at least one file already present (or a generated checksum of the at least one file) is included in the signed release bundle information. In this manner, the verification confirms that all of the files of the release bundle (e.g., corresponding to the signed release bundle) have been received.

At 812, method 800 includes closing the release bundle transaction session in response to verification, based on the signed release bundle information, that each of the one or more files is included in the transaction directory. In some implementations, prior to closing the release bundle transaction session, an acknowledgement may be sent indicating that all the files of the release bundle have been received. Additionally, or alternatively, closing of the release bundle transaction may occur responsive to the acknowledgement. In some such implementations, based on the verification, the one or more files may be made available for download via an API. For example, the one or more files may be made available from the transaction directory or may be moved stored to a particular location form which the one or more files are made available.

In a particular implementation, method 800 includes identifying one or more files based on the signed release bundle information and receiving a file to be loaded into the transaction directory. Additionally, or alternatively, in some implementations, method 800 includes, in response to verification that each of the one or more files is included in the transaction directory, generating a checksum for an entirety of the one or more files and identifying a checksum for the whole bundle. In some such implementations, verifying that the signed bundle is transmitted to the one or more node devices includes verifying the one or more files are included in the transaction directory corresponding to the one or more node devices based on a checksum verification. In some such implementations, method 800 further includes receiving, for each file of the at least one file included in the transaction directory, a corresponding checksum and, for each of the received checksums of the at least one file included in the transaction directory, determining whether the checksum matches a checksum of the one or more files. If less than all of the files needed in the transaction directory are present, a notification/request can be sent to request retransmission (e.g., redistribution) of the file that is not present.

In some such implementations, method 800 further includes comparing the checksum for the entirety of the one or more files and the checksum for the whole bundle (e.g., a checksum generated for an entirety of the signed release bundle information), authorizing transfer of the one or more files from the transaction directory to a memory of a node device based on a match between the checksum for the entirety of the one or more files and the checksum for the whole bundle, and applying meta data included in the release bundle information to the one or more files transferred to the memory. In some such implementations, closing the release bundle transaction session is further based on the checksum for the entirety of the one or more files and the checksum for the whole bundle. Additionally, or alternatively, method 800 may further include, in response to a determination that each of one or more files corresponding to the signed release bundle information is not included in the transaction directory, rejecting the software release.

Thus, method 800 describes distribution of a release bundle (e.g., release bundle information) to efficiently, consistently, and securely distribute of software. For example, the release bundle including the release bundle information may indicate one or more files of a software release, such as one or more files corresponding to multiple services, multiple applications, and/or multiple types of files. Additionally, the release bundle may advantageously be used by a target device (e.g., node device 160, 360, target replicator device 608, target release device) to identify/verify a source of the release bundle, identify/verify the one or files, and arrange/assemble the one or more files. In some implementations, the release bundle may be signed to render the release bundle immutable, thereby protecting the release bundle from tampering and increasing security of the software release.

Referring FIG. 9, a flow diagram of a method for receiving a software release according to an embodiment is shown as a method 900. In a particular implementation, method 900 may be performed by server 110, 298 (e.g., one or more processors 250, 322, deployer 253 and/or replicator 254), node device 160, 160a, 160b, 160c, 160d, target replicator device 608, and/or target release device 610.

At 902, method 900 includes receiving a bundle including signed release bundle information corresponding to one or more files. The signed release bundle information includes meta data and, for each file of the one or more files, a corresponding checksum. At 904, method 900 includes verifying a source of the signed release bundle information. At 906, method 900 includes storing at least one received file at a transaction directory. At 908, method 900 includes verifying each of one or more files corresponding to the signed release bundle information is present. At 910, method 900 includes verifying an entirety of the one or more files corresponding to the signed release bundle information. At 912, method 900 further includes storing the one or more files and applying the meta data to a file of the one or more files.

Thus, method 900 describes distribution of a release bundle (e.g., release bundle information) to securely distribute of software. For example, release bundle information may indicate one or more files of a software release, such as one or more files corresponding to multiple services, multiple applications, and/or multiple types of files. In some implementations, the release bundle may be signed to render the release bundle immutable, thereby protecting the release bundle from tampering and increasing security of the software release. Additionally, the release bundle may advantageously be used by a target device (e.g., node device 160, 360, target replicator device 608, target release device) to identify/verify a source of the release bundle, identify/verify the one or files, and arrange/assemble the one or more files.

In some implementations, methods 700, 800, 900 and/or operations described with reference to at least FIG. 6 can be combined such that one or more operations described with reference to one of the methods of FIGS. 7-9 and one or more operations described above with reference to FIG. 6 may be combined with one or more operations of another of FIGS. 7-9 and the process of FIG. 6. For example, one or more operations of method 700 may be combined with one or more operations of method 800. As another example, one or more operations of method 800 may be combined with one or more operations of method 900. Additionally, or alternatively, one or more operations described above with reference to FIG. 6 may be combined with one or more operations of one of FIGS. 7-8 or of a combination of FIGS. 7-8.

Figure 13A:
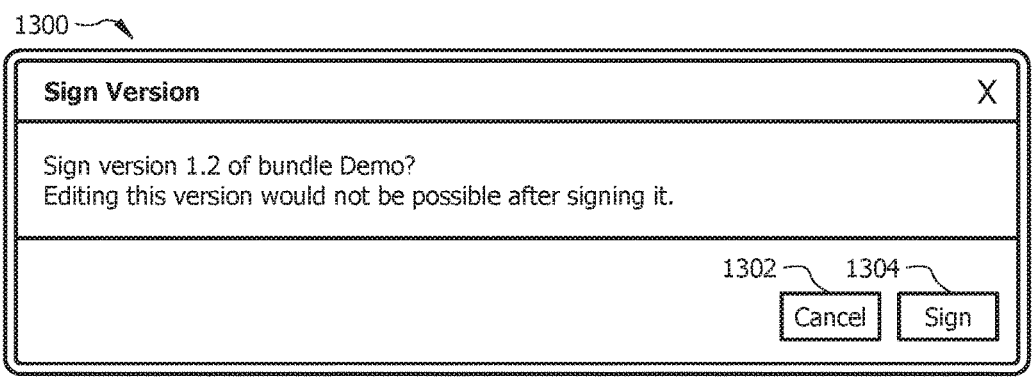
FIGS. 13A-13B illustrate examples of views associated with signing a release bundle.
Figure 13B:
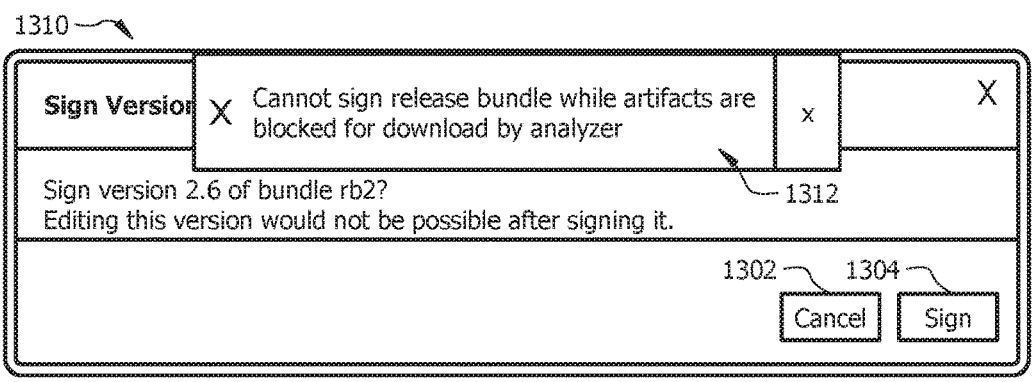
Figure 14:
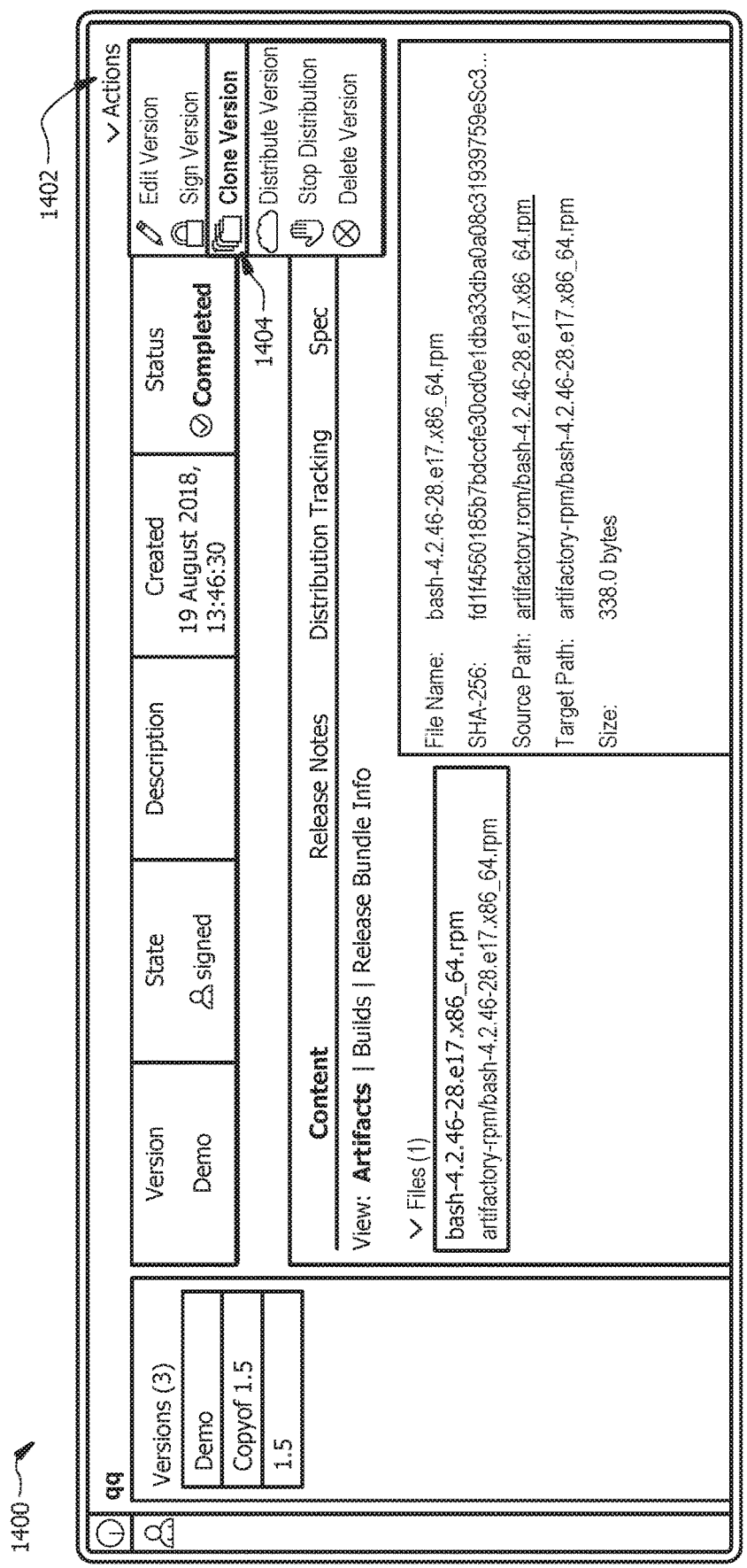
FIG. 14 illustrates an example of a view associated with cloning a release bundle.
Figures 15A, 15B, 16A:
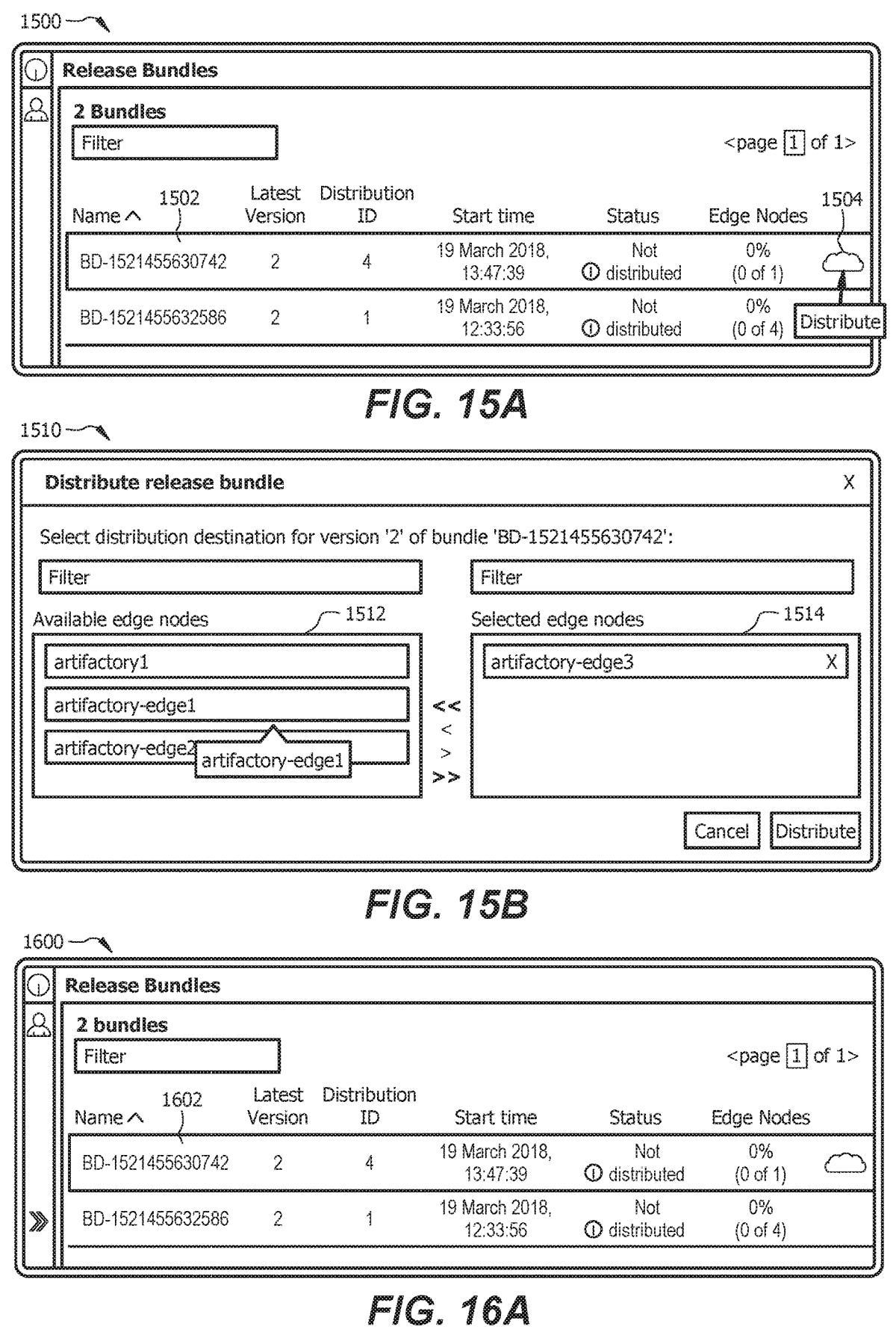
Figure 16B:
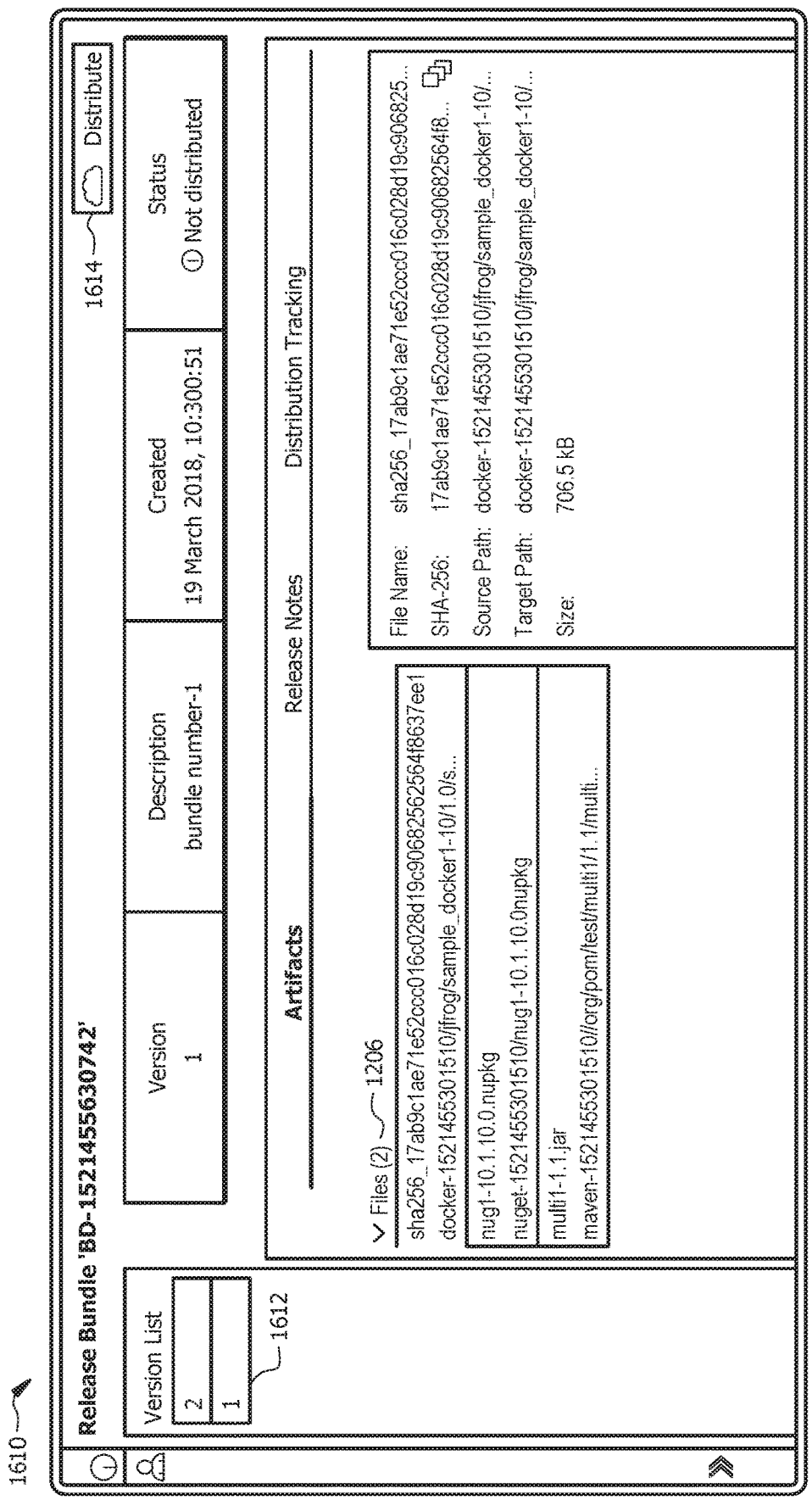
Figure 19C:
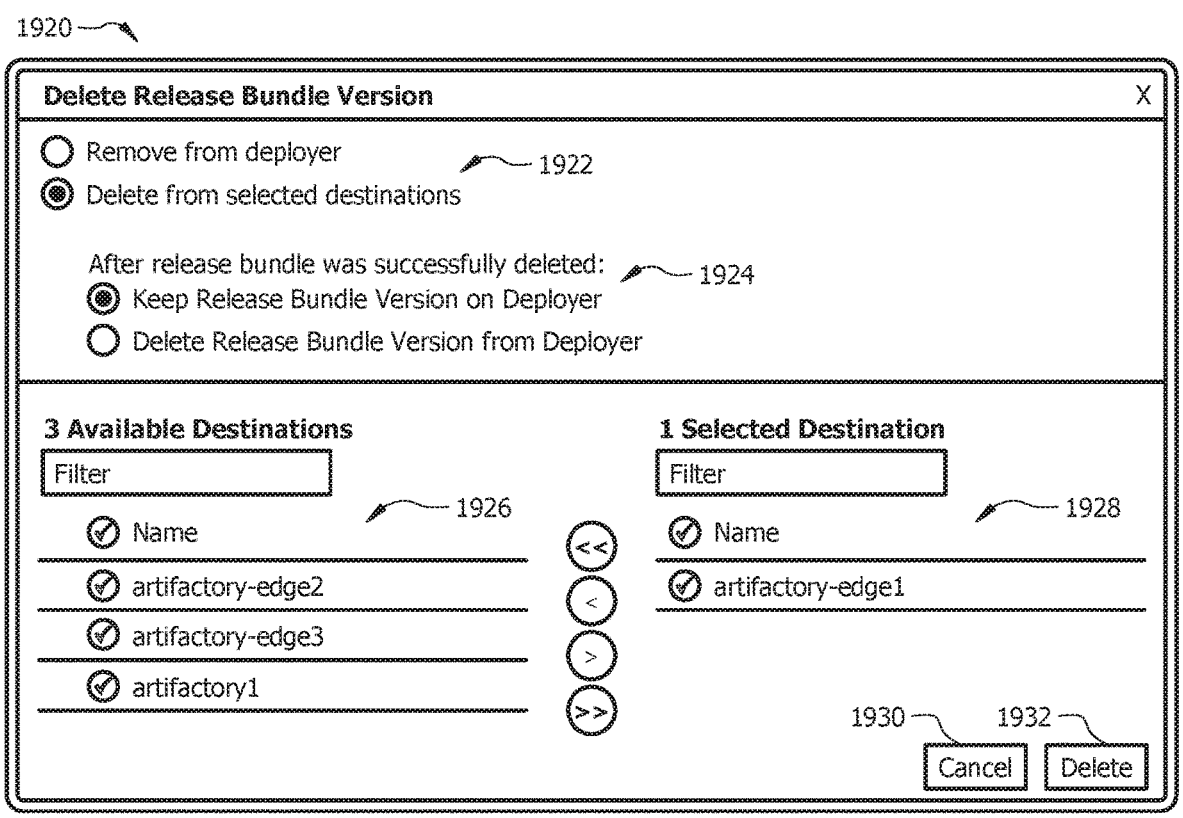

Referring to FIGS. 10A-10B, 11A-11D, 12A-12G, 13A-13B, 14, 15A-15B, 16A-16B, 17A-17B, 18, and 19A-19C, one or more views provided by system 100, 200, 300 are shown. To illustrate, the one or more views may be initiated at or by. For example, FIGS. 10A-10B include views associated with creating a release bundle. FIGS. 11A-11D include views associated with adding a query to create a release bundle. FIGS. 12A-12G include views associated with viewing a release bundle. FIGS. 13A-13B include views associated with signing a release bundle. FIG. 14 includes a view associated with cloning a release bundle. FIGS. 15A-15B include views associated with distributing a release bundle. FIGS. 16A-16B include views associated with distributing a prior version of a release bundle. FIGS. 17A-17B include views associated with viewing distributed release bundles. FIG. 18 includes a view associated with a release bundle repository. FIGS. 19A-19C include views associated with deleting a release bundle.

One or more of the views may include or correspond to a graphical user interface (GUI) generated by server 110, 298 (e.g., on or more processors 250 and/or manager 252) and/or release device 320 (e.g. one or more processors 322) and presented by a display device, such as a display device of entity 150, 150a, 150b, distributor device 310, and/or distributor device 602. Additionally, or alternatively, interactions (e.g., input selections) with the views may be initiated by entity 150, 150a, 150b, distributor device 310, and/or distributor device 602 (e.g., a user device) and communicated to server 110, 298 (e.g., on or more processors 250 and/or manager 252) and/or release device 320 (e.g. one or more processors 322), and operations/functions to present and/or modify the views may be performed by server 110, 298 (e.g., on or more processors 250 and/or manager 252) and/or release device 320 (e.g. one or more processors 322) and communicated to entity 150, 150a, 150b, distributor device 310, and/or distributor device 602.

Referring to FIGS. 10A-10B, views associated with creating a new release bundle are shown. For example, referring to FIG. 10A, a first view of a GUI is shown and designated 1000. First view 1000 displays a release bundle page. First view 1000 includes a list of available release bundles, such as illustrative release bundle 1002. Information about release bundle 1002 is displayed, such as the latest version number, the distribution ID, the start date, the status, and the progress. Although one release bundle is shown, in other implementations, more than one release bundle may be shown if more than one release bundle has been created. First view 1000 also includes an add release bundle option 1004. Selection of add release bundle option 1004 enables a user to add a new release bundle. Examples of views presented/available responsive to selection of add release bundle option 1004 are described further herein with reference to FIG. 10B.

Referring to FIG. 10B, a second view presented responsive to selection of add release bundle option 1004 is shown and designated 1010. Second view 1010 displays a new release bundle page. The release bundle page enables a user to create a draft release bundle that can be edited, signed, and finally distributed. Alternatively, the draft phase can be skipped, as further described herein, and a signed release bundle may be generated.

The Release Bundle page is divided into three panels: a General Details panel 1012, a Spec panel 1014, and a Release Notes panel 1016. General Details panel 1012 includes information about general details of the release bundle, such as a name, a version, and a description. For example, a name field 1020, a version field 1022, and a description field 1024 are included in a particular implementation of General Details panel 1012. Fields 1020-1024 enable a user to select a name, a version, and a description (respectively) for the release bundle.

Spec panel 1014 includes information that specifies the location (e.g., memory) from which the release bundle will be assembled and the different queries that will be used to assemble the artifacts within the release bundle. In a particular implementation, a release bundle is assembled from a single memory. Spec panel 1014 includes a source repository field 1030 that enables selection of the server used to assemble the release bundle. Spec panel 1014 also includes a query name 1032 and query details 1034. Query name 1032 specifies the name of the query that is to be used to assemble the artifacts within the release bundle. To add a new query, new query option 1036 may be selected. Examples of views presented/available responsive to the new query option 1036 are further described herein with reference to FIGS. 11A-11D.

Release Notes panel 1016 includes information that specifies release notes for the release bundle. Release Notes panel 1016 includes a type field 1040 that is used to select the release notes format. In some implementations, supported types include: Markdown, Asciidoc and plain text. Release Notes panel 1016 also includes an edit option 1042 and a preview option 1044. Selection of edit option 1042 enables editing of the release notes in the selected format, and selection of preview option 1044 enables display of the release notes to enable a user to preview how the release notes will look once rendered.

Second view 1010 also includes a cancel option 1046, a create option 1048, and a create and sign option 1050. The cancel option 1046 enables cancellation of the current release bundle. Selection of create option 1048 creates a draft release bundle that can then be edited, signed, and distributed. Alternatively, selection of create and sign option 1050 creates a release bundle without a draft phase and signs the release bundle. In at least some implementations, a signed release bundle is immutable (e.g., cannot be changed).

Referring to FIGS. 11A-11D, views associated with adding a query are shown. For example, referring to FIG. 11A, a first view of a GUI is shown and designated 1100. First view 1100 displays an add query page. The add query page may be displayed by selection of the add new query option 1036 of FIG. 10B. First view 1100 includes a progress bar including a query details indicator 1102, a preview artifacts indicator 1104, and an additional details indicator 1106. First view 1100 shows the query details portion of the add query page (as shown by query details indicator 1102 being accented).

First view 1100 includes a name field 1108 configured to enable a user to enter a name for the query. First view 1100 also includes query details 1110. Query details 1110 displays the query to be used to assemble the artifacts in the release bundle. The query can be entered manually or through a query builder that includes options to specify different search criteria including repository names, build names and numbers, properties with specific values, and include and exclude patterns, as non-limiting examples.

First view 1100 also includes a cancel option 1112 and a next option 1114. Selection of cancel option 1112 cancels the current query addition process. Selection of next option 1114 transitions to the preview artifacts portion of the add query page.

Referring to FIG. 11B, a second view presented responsive to selection of next option 1114 is shown and designated 1120. Second view 1120 displays a preview artifacts portion of the add query page. For example, information associated with one or more artifacts to be included in the release bundle is displayed. To illustrate, names 1122, paths 1124, status 1126, and sizes 1128 for each artifact are displayed. Names 1122 indicate the names of the artifacts. Paths 1124 indicate the file paths of the artifacts. Status 1126 indicates whether a particular artifact is blocked (due to a security issue or vulnerability). Sizes 1128 indicate the files sizes of the artifacts.

Second view 1120 also includes a cancel option 1130, a back option 1132, and a next option 1134. Selection of cancel option 1130 cancels the current query addition process. Selection of the back option 1132 returns to the query details portion of the add query page. Selection of next option 1134 transitions to the additional details portion of the add query page.

Referring to FIG. 11C, a third view is shown and designated 1140. In third view 1140, an error message 1142 is displayed. To prevent artifacts with issues or vulnerabilities from being delivered to their target servers, release bundles that contain artifacts which have been blocked for download by analyzer 258 of FIG. 2 due to a detected vulnerability, a security rule, and/or a license rule and cannot be signed, and consequently, cannot be distributed. If the query used to select the artifacts for a release bundle pulls in a blocked artifact, the artifact will be included in the release bundle, and the status 1126 will indicate that it has been blocked. An attempt to sign this release bundle will fail and an error message, such as error message 1142, is displayed.

If the artifact ceases to be blocked for download, to update the status of the artifact, the query that pulls the artifact into the release bundle is run again. If the artifact no longer has the issue, the indication (e.g., the status 1126) that it is blocked is removed. Once the "Blocked" indication is removed from the status 1126, the release bundle can be signed and distributed. Additionally, or alternatively, if the source or target servers specified for the release bundle does not have a correct and valid license, an error message, such as the error message 1142, is displayed.

Referring to FIG. 11D, a fourth view presented responsive to selection of next option 1134 is shown and designated 1150. Fourth view 1150 displays an additional details portion of the add query page. Fourth view 1150 includes an additional properties panel 1152 and a path mappings panel 1154. The additional properties panel 1152 enables a user to specify a list of properties which will be attached to all artifacts in the release bundle during the distribution process, in addition to those properties the artifacts already have.

Path mappings panel 1154 enables a user to specify a list of mappings to govern where artifacts will be placed in the selected target repository according to their location in the selected source repository. Path mappings may be specified using a path mapping template or by creating custom path mappings. In some implementations, a set of commonly used templates are provided for use in setting up path mappings. To use a template, the template is selected from a list of templates, then the user modifies the placeholders to correspond with the desired setup. Some illustrative templates include change repository (e.g., all files in a specific repository on the source repository are mapped to a different repository on the target), change folder (e.g., all files are moved to a specific folder in the target), and rename folder (e.g., all files in a specific folder on the source repository are mapped to a different folder on the target), as non-limiting examples.

Referring to FIGS. 12A-12G, views associated with viewing a release bundle are shown. For example, referring to FIG. 12A, a first view of a GUI is shown and designated 1200. First view 1200 displays a release bundle page. The release bundles that are managed (e.g., by the system 200) are displayed, and selection of a particular release bundle enables display of the first view 1200.

First view 1200 includes three panels of information: a versions panel 1202, a general information panel 1204, and a details panel 1206. Versions panel 1202 includes a list of versions of the selected release bundle. Selection of any version in the version panel 1202 enables view of details of the selected version. General information panel 1204 is displayed along the top of the screen and includes general information such as the version, description, creation date, status and size of the release bundle. Details panel 1206 includes details about the selected release bundle version in a series of tabs: a content tab 1210, a release notes tab 1212, a distribution tracking tab 1214, and a spec tab 1216.

Referring to FIG. 12B, a second view presented responsive to selection of content tab 1210 is shown and designated 1220. Second view 1220 represents a close-up view of details panel 1206 when contents tab 1210 is selected. In second view 1220, details panel 1206 displays the artifacts, builds, and metadata that comprise the release bundle. Selection of one of options 1222 enables a view of details 1224 about artifacts, builds, or release bundle information in the right panel in the details panel 1206. If an artifact has been blocked for download by the analyzer 258 (in which case, signing and distribution of the release bundle will be prevented), this will be indicated in the Status field for the selected artifact in the details panel 1206.

Referring to FIG. 12C, a third view presented responsive to selection of release notes tab 1212 is shown and designated 1230. Third view 1230 represents a close-up view of details panel 1206 when release notes tab 1212 is selected. Third view 1230 includes release notes 1232 for the release bundle. In some implementations, the release notes are written in Markdown, Asciidoc, or plain text, as non-limiting examples.

Referring to FIG. 12D, a fourth view presented responsive to selection of distribution tracking tab 1214 is shown and designated 1240. Fourth view 1240 represents a close-up view of details panel 1206 when distribution tracking tab 1214 is selected. Fourth view 1240 includes a distribution history 1242 for the selected version of the release bundle. Information included in distribution history 1242 includes one or more entries, each entry including a name (e.g., an ID of the distribution action), an action (e.g., the action that was performed, such as distribute), the date and time at which the action was started, the destination (e.g., the distribution target), the status of the action (e.g., completed, failed, etc.), the progress of the action (e.g., the percentage completion and number of attempts at completion), and a summary of some details about the action.

The release bundle may be redistributed (if distribution failed) through selection of a redistribution option 1244. For example, distribution may fail for different reasons such as network issues or outage of a target device (e.g., a server 110, 298, a node device 160, a release device 320, a target replicator device 608, or a target release device). Once the problem preventing distribution is remedied, redistribution of the release bundles can occur to the device where distribution failed. Once a release bundle is selected, the release bundle may be redistributed individually to the specified target device via a redistribution icon that appears, or the release bundle may be redistributed to all target devices selected in a batch process by selection of the redistribution option 1244.

Referring to FIG. 12E, a fifth view presented responsive to selection of spec tab 1216 is shown and designated 1250. Fifth view 1250 represents a close-up view of details panel 1206 when spec tab 1216 is selected. In fifth view 1250, details panel 1206 displays detail information 1252 including the source reciprocity (e.g., server 110) from which the artifacts of this release bundle were assembled as well as the list of queries that assembled the artifacts. Clicking on any of the queries expands the selected query, displaying the details of the query that governed the assembly of the release bundle artifacts. Checking the ACYL (query language) checkbox to enables a view of the final AQL query that was used to assemble the artifacts.

Figure 12A:
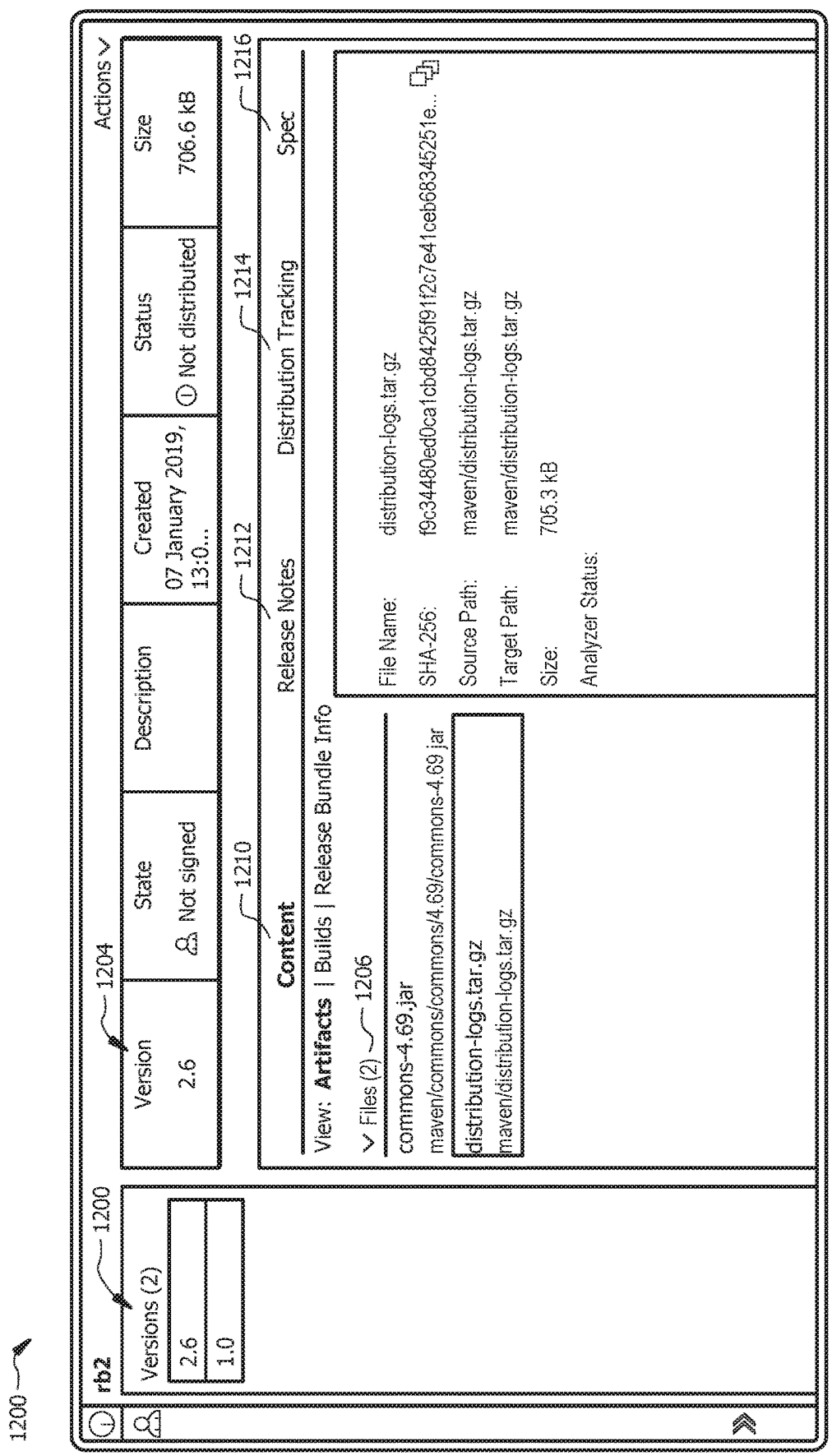
Figure 12F:
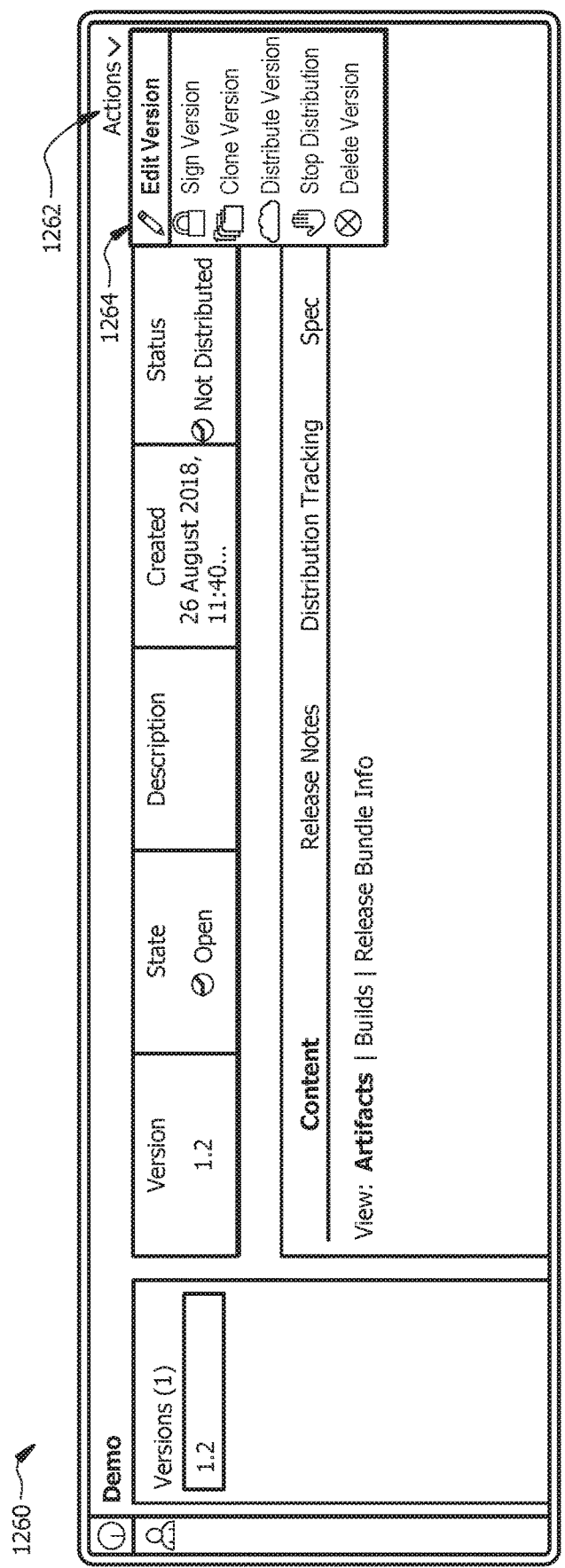

Referring to FIG. 12F, a sixth view presented of the release bundle page is shown and designated 1260. Sixth view 1260 illustrates a process of editing a release bundle. For example, a version of a release bundle may be selected in versions panel 1202. After selecting the version of the release bundle, an action list option 1262 is selected, which causes a drop-down menu of options to be displayed. To edit a release bundle, a user selects an edit version option 1264.

Figure 12G:
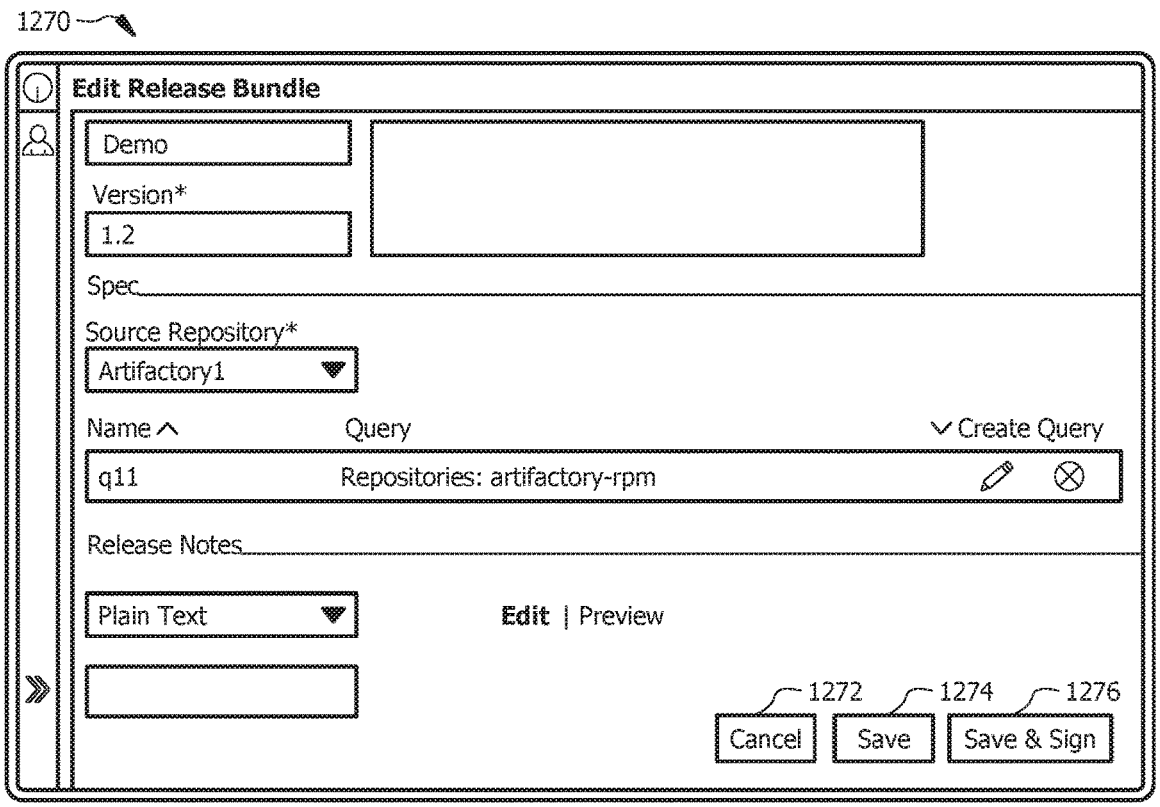

Referring to FIG. 12G, a seventh view presented in response to selection of edit version option 1264 is shown and designated 1270. Seventh view 1270 displays an edit release bundle page. The edit release bundle page enables a user to make changes to parameters of the release bundle, such as the name, the version, the source repository, the queries used, and the release notes, similar to as described with reference to FIG. 10B. Seventh view 1070 also includes a cancel option 1072, a save option 1074, and a save and sign option 1076. The cancel option 1072 enables cancellation of the current edits to the release bundle. Selection of save option 1074 saves the edits to the release bundle. Alternatively, selection of save and sign option 1076 creates a release bundle (with the edits) without a draft phase and signs the release bundle. In at least some implementations, a signed release bundle is immutable (e.g., cannot be changed).

Referring to FIGS. 13A-13B, views associated signing a release bundle are shown. For example, referring to FIG. 13A, a first view of a GUI is shown and designated 1300. First view 1300 displays a sign release bundle window. The sign release bundle window may be displayed after selection of a sign option, such as create and sign option 1050 or save and sign option 1076, as non-limiting examples. Signing a release bundle finalizes the process of creating a release bundle. This sets the release bundle status to signed and the release bundle can no longer be edited. In addition, deployer 253 will trigger the source replicator 254 clone the contents of the signed release bundle into an isolated release-bundles repository (e.g., a portion of a memory). The sign release bundle window includes a cancel option 1302 and a sign option 1304. Selection of the cancel option 1302 cancels the signing process (and returns to a previous screen or removes the sign release bundle window). Selection of the sign option 1304 finalizes the signing process. After signing, the release bundle may be distributed, as described with reference to FIGS. 15A-15B.

Referring to FIG. 13B, a second view responsive to an error in the signing process is shown and designated 1310. In second view 1310, an error message 1312 is displayed. Error message 1312 is displayed if the release bundle includes any artifacts that have been blocked for download by analyzer 258. Consequently, the release bundle is unable to be signed. Once the issues are remedied, as described with reference to FIG. 11C, the user may again select sign option 1304 to finalize the signing process.

Referring to FIG. 14, a first view presented of the release bundle page is shown and designated 1400. First view 1400 illustrates a process of cloning a release bundle. For example, a version of a release bundle may be selected in versions panel 1202. After selecting the version of the release bundle, an action list option 1402 is selected, which causes a drop-down menu of options to be displayed. To clone a release bundle, a user selects a clone version option 1404. This will copy the release bundle spec, including its name and queries, into a new release bundle page. Details on the new release bundle page can then be adjusted and saved accordingly.

Referring to FIGS. 15A-15B, views of associated with distributing a release bundle are shown. For example, with reference to FIG. 15A, a first view of the release bundle page is shown. First view 1500 includes one or more release bundles, such as illustrative release bundle 1502. Information associated with release bundles is displayed, including names, latest version numbers, distribution IDs, start times, status, and nodes served. To distribute release bundle 1502, a user may select distribute option 1504. In an alternate implementation, distribution may be achieved via use of a distribute release bundle REST API corresponding to deployer 253.

Referring to FIG. 15B, a second view of a distribute release bundle window is shown and designated 1510. The distributed release bundle window may be displayed in response to selection of distribute option 1504. The distribute release bundle window includes a list of available nodes 1512 (e.g., node devices) that lists the available nodes to which the release bundle may be distributed. A user can select one or more of the displayed nodes and add them to a list of selected nodes 1604. For example, a node can be "dragged and dropped" (e.g., using a mouse) or selected, followed by selection of an on-screen arrow, to add the selected node to list of selected nodes 1514. In some implementations, filter fields may be displayed and may enable a user to filter lists 1512, 1514.

Figure 16C:
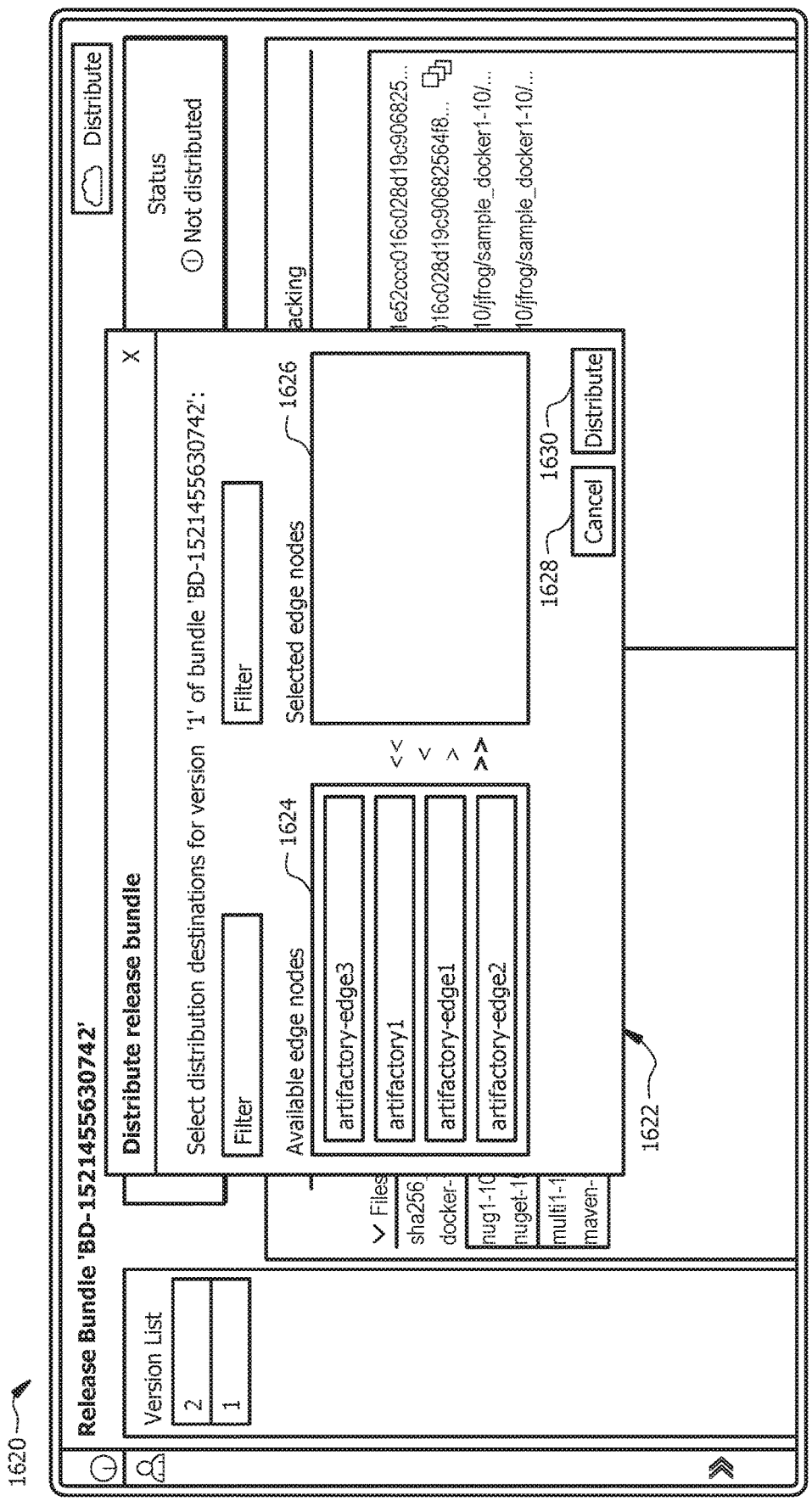

Referring to FIGS. 16A-16C, views associated with distributing an old release bundle are shown. For example, referring to FIG. 16A a first view of the release bundle page is shown. First view 1600 includes one or more release bundles, such as illustrative release bundle 1602. Information associated with release bundles is displayed, including names, latest version numbers, distribution IDs, start times, status, and nodes served. To select an older version, a user first selects the release bundle to be distributed.

Referring to FIG. 16B, a second view of a release bundle page is shown and designated 1610. Second view 1610 is displayed in response to selection of release bundle 1602. In a versions panel, a user may select an older version of the release bundle, such as illustrative older version 1612. Information about older version 1612 may be displayed, as described with reference to FIGS. 12A-12E. To distribute older version 1612, a distribute option 1614 may be selected.

Referring to FIG. 16C, a third view of a release bundle page responsive to selection of distribute option 1614 is shown and designated 1620. Third view 1620 includes a distribute release bundle window 1622. Distribute release bundle window 1622 includes a list of available nodes 1624, a list of selected nodes 1626, a cancel option 1628, and a distribute option 1630, which operate similarly to as described with reference to FIG. 15B.

Referring to FIGS. 17A-17B, views associated with viewing distributed release bundles are shown. For example, referring to FIG. 17A, a first view of a distributed release bundle page is shown and designated 1700. First view 1700 is accessible through selection of release bundles options 1702. First view 1700 enables viewing of release bundles in the source server and the node devices (e.g., edge nodes). A received tab 1704 contains the release bundles received by a server. A distributable tab 1706 indicates the release bundles that have been signed by an entity (e.g., 150) and are ready to be distributed from a source server to an node device. Selecting the name of a release bundle will transition to a detail page.

Referring to FIG. 17B, a second view of release bundle detail page is shown and designated 1710. The release bundle detail page is divided into four panels: a versions panel 1712, a basic information panel 1714, an artifacts panel 1716, and an artifacts detail panel 1718. Versions panel 1712 displays all versions of the selected release bundle that have been replicated over to the node. Basic information panel 1714 (e.g., the horizontal panel along the top) displays basic information about the selected version. Artifacts panel 1716 displays the full list of files included in the selected release bundle version. Artifact details panel 1718 display details about a selected file in the panel on the right. A search can be performed from using a search query.

Referring to FIG. 18, a first view associated with a release bundle repository is shown and designated 1800. The release bundle repository protects the artifacts created in the source server, by copying the artifacts into a separate repository where their contents cannot be edited or removed. Whenever a new release bundle is created and signed from an entity (e.g., 150), the new release bundle is copied and saved into this immutable release-bundles repository in the source server. This ensures consistency in the artifacts being distributed among target instances.

In a particular implementation, the release bundles repository is automatically created and used by default to store one or more release bundles. However, users can create additional repositories with their own naming conventions that can also be used for storing and/or distributing release bundles.

Referring to FIGS. 19A-19C, views associated with deleting a release bundle are shown. For example, referring to FIG. 19A, a first view of a release bundle page is shown. Before deleting a release bundle, for consistency across a repository (e.g., 210, 330) and deployer (e.g., 253), it is recommended to delete release bundles directly from deployer (e.g., 253), and not from the repository. To protect the release bundle, individual artifacts cannot be deleted from a repository (e.g., 210, 330). To delete a release bundle from the GUI, a user may hover a mouse (or use a touchpad) over a version until a delete option 1902 appears. Selecting delete option 1902 deletes the release bundle.

Referring to FIG. 19B, a second view of a release bundle page is shown and designated 1910. Release bundles can be deleted using a GUI (corresponding to deployer 253) or the Delete Release Bundle REST API call (corresponding to deployer 253), which may be available for users with release bundle delete permissions. To delete an existing release bundle version, a user selects an action menu 1912 to cause an actions drop down menu to be displayed, and a delete option 1914 may be selected from the drop down menu.

Referring to FIG. 19C, a third view of a delete release bundle version window that is responsive to selection of delete option 1902 or delete option 1914 is shown and designated 1920. The delete release bundle version window includes a first option 1922 to enable deletion from deployer 253 or from selected destinations. The delete release bundle window also includes a second option 1924 to enable the deleted release bundle version to be kept on deployer 253 or to be deleted from deployer 253. The delete release bundle window may also include a list of available destinations 1926 (e.g., nodes that the release bundle was sent to) and a list of selected destinations 1928 (e.g., nodes from which the release bundle is to be deleted), based on the selection of first option 1922. The delete release bundle window also includes a cancel option 1930 for cancelling the deletion and a delete option 1932 for finalizing the deletion.

Although FIGS. 10A-10B, 11A-11D, 12A-12G, 13A-13B, 14, 15A-15B, 16A-16B, 17A-17B, 18, and 19A-19C describe various fields, options, and information, such description is for illustrative purposes and is not limiting. In other implementations, the views illustrated in FIGS. 10A-10B, 11A-11D, 12A-12G, 13A-13B, 14, 15A-15B, 16A-16B, 17A-17B, 18, and 19A-19C may include more or fewer fields, options, and information than described above.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium in the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for distributing a software release, the method comprising:
    receiving, by one or more processors of a computing device, an indication from a distributor device of one or more files for distribution, the computing device distinct from the distributor device, the one or more files corresponding to a package type supported by node devices of an entity;
    generating, by the one or more processors of the computing device, a bundle based on the one or more files, the bundle comprising release bundle information generated based on the one or more files, the release bundle information comprising file meta data corresponding to the one or more files and bundle meta data corresponding to an entirety of the one or more files, the bundle meta data comprising a release name and a release version;
    securing, by the one or more processors of the computing device, the bundle to generate a secured bundle;
    receiving, by the one or more processors of the computing device, a selection from the distributor device, the selection of one or more node devices of the node devices of the entity to receive the secured bundle;
    initiating, by the one or more processors of the computing device, transmission of the secured bundle to each of the one or more node devices, and verifying, by the one or more processors of the computing device, that the secured bundle is transmitted to the one or more node devices, wherein the verifying comprises:
        receiving, by the one or more processors of the computing device, for each file of at least one file included in one or more transaction directories corresponding to the one or more node devices, a corresponding checksum from the one or more node devices; and
        for each of the received checksums of the at least one file included in the one or more transaction directories, determining, by the one or more processors of the computing device, whether the received checksum matches a checksum of the one or more files;
    wherein, upon verification by the one or more node devices, transfer of the one or more files from the one or more transaction directories to one or more memories of the one or more node devices is authorized and the file meta data is applied to the one or more files.

2. The method of claim 1, wherein the indication received by the one or more processors of the computing device from the distributor device comprises a list of release updates, and further comprising:
    identifying, by the one or more processors of the computing device, the one or more files based on the list of release updates; and
    accessing, by the one or more processors of the computing device, each of the one or more files at a memory of the computing device.

3. The method of claim 1, wherein generating the bundle comprises:
    generating, by the one or more processors of the computing device, the release bundle information based on the one or more files.

4. The method of claim 1, wherein:
    the one or more files include one or more parts;
    generating the release bundle information comprises:
        for each part of the one or more parts, generating a corresponding checksum; and
        generating a bundle checksum for the entirety of the one or more files; and
    the bundle includes the release bundle information and does not include the one or more files.

5. The method of claim 1, wherein securing the bundle comprises:
    attaching, by the one or more processors of the computing device, a signature to the bundle to generate a signed bundle, the secured bundle indicating the signed bundle.

6. The method of claim 5, further comprising:
    generating, by the one or more processors of the computing device, the signature based on a private key corresponding to the distributor device.

7. The method of claim 1, further comprising:
    based on input received from the distributor device, replacing, by the one or more processors of the computing device, at least one file of the one or more files with a different file prior to generation of the bundle, the bundle generated based on the different file.

8. The method of claim 1, further comprising:
    receiving, by the one or more processors of the computing device, distribution parameters from the distributor device, the distribution parameters comprising a date, a time, or both, corresponding to the transmission of the secured bundle; and
    initiating transmission of the secured bundle in accordance with the distribution parameters.

9. The method of claim 1, further comprising:
    receiving, by the one or more processors of the computing device, a request to initiate a distribution transaction session from the distributor device;
    initiating, by the one or more processors of the computing device, presentation at the distributor device of a user interface for the distribution transaction session;
    receiving, by the one or more processors of the computing device, a transmission request from the distributor device to distribute the secured bundle to the one or more node devices; and
    after verification that the secured bundle is transmitted to the one or more node devices and each of the one or more files are present at the one or more node devices, closing, by the one or more processors of the computing device, the distribution transaction session.

10. The method of claim 1, wherein a first node device of the one or more node devices comprises an Internet of things (IoT) device.

11. The method of claim 1, wherein the secured bundle is immutable.

12. A system for distributing a software release, the system comprising:
a computer device comprising:
at least one memory storing instructions; and
one or more processors coupled to the at least one memory, the one or more processors configured to execute the instructions to cause the one or more processors to:
receive an indication from a distributor device of one or more files for distribution, the computing device distinct from the distributor device, the one or more files corresponding to a package type supported by node devices of an entity;
generate a bundle based on the one or more files, the bundle comprising release bundle information generated based on the one or more files, the release bundle information comprising file meta data corresponding to the one or more files and bundle meta data corresponding to an entirety of the one or more files, the bundle meta data comprising a release name and a release version;
secure, by the one or more processors, the bundle to generate a secured bundle;
receive a selection from the distributor device, the selection of one or more node devices of the node devices of the entity to receive the secured bundle;
initiate transmission of the secured bundle to each of the one or more node devices; and
verify that the secured bundle is transmitted to the one or more node devices, wherein performing the verifying causes the one or more processors to:
receive, for each file of at least one file included in one or more transaction directories corresponding to the one or more node devices, a corresponding checksum from the one or more node devices; and
for each of the received checksums of the at least one file included in the one or more transaction directories, determine whether the received checksum matches a checksum of the one or more files;
wherein, upon verification by the one or more node devices, transfer of the one or more files from the one or more transaction directories to one or more memories of the one or more node devices is authorized and the file meta data is applied to the one or more files.

13. The system of claim 12, wherein the one or more processors are further configured to execute the instructions to cause the one or more processors to track permission levels of release content corresponding to the bundle.

14. The system of claim 12, wherein, to generate the release bundle information, the one or more processors are further configured to execute the instructions to cause the one or more processors to, for each file of the one or more files:
generate a corresponding file checksum; and
identify the corresponding file meta data comprising a size of the file, a version of the file, a source of the file, or a combination thereof.

15. The system of claim 12, wherein, to generate the release bundle information, the one or more processors are further configured to execute the instructions to cause the one or more processors to generate a release checksum for an entirety of the one or more files.

16. The system of claim 12, wherein to secure the bundle, the one or more processors are further configured to execute the instructions to cause the one or more processors to attach a signature to the bundle to generate a signed bundle, the secured bundle indicating the signed bundle.

17. A method for receiving a software release, the method comprising:
initiating, by one or more processors of a target release device, a release bundle transaction session corresponding to a software release;
receiving, by the one or more processors of the target release device, a bundle including secured release bundle information from a computing device distinct from the target release device, the secured release bundle information comprising file meta data corresponding to one or more files and bundle meta data corresponding to an entirety of the one or more files, the bundle meta data comprising a release name and a release version;
verifying, by the one or more processors of the target release device, a source of the secured release bundle information;
after verification of the source, identifying, by the one or more processors of the target release device, a transaction directory;
verifying, by the one or more processors of the target release device, each of the one or more files corresponding to the file meta data is included in the transaction directory, the one or more files corresponding to a package type supported by node devices of an entity;
closing, by the one or more processors of the target release device, the release bundle transaction session in response to verification, based on the secured release bundle information, that each of the one or more files is included in the transaction directory;
in response to verifying that each of the one or more files is included in the transaction directory, generating, by the one or more processors of the target release device, a checksum for an entirety of the one or more files included in the transaction directory;
comparing, by the one or more processors of the target release device, the checksum for the entirety of the one or more files included in the transaction directory and a bundle checksum included in the secured release bundle information;
authorizing, by the one or more processors of the target release device, transfer of the one or more files from the transaction directory to a memory of a node device based on a match between the checksum for the entirety of the one or more files included in the transaction directory and the bundle checksum; and
applying, by the one or more processors of the target release device, the file meta data included in the secured release bundle information to the one or more files transferred to the memory.

18. The method of claim 17, further comprising:
selectively authorizing, by the one or more processors of the target release device, transfer of the one or more files from the transaction directory to a memory of a node device that is distinct from the target release device.

19. The method of claim 17, wherein the secured release bundle information comprises signed release bundle information, and wherein verifying the source of the signed release bundle information comprises:

identifying, by the one or more processors of the target release device, a signature corresponding to the signed release bundle information, the signature generated based on a private key of a distributor device;

accessing, by the one or more processors of the target release device, a public key from a memory of a node device, the public key corresponding to the private key; and decoding, by the one or more processors of the target release device, the signature based on the public key.

20. The method of claim 17, further comprising:

identifying, by the one or more processors of the target release device, the one or more files based on file meta data included in the secured release bundle information; and receiving, by the one or more processors of the target release device, a file of the one or more files to be loaded into the transaction directory.

21. The method of claim 17, further comprising:

generating, by the one or more processors of the target release device, checksums for the one or more files included in the transaction directory; and comparing, by the one or more processors of the target release device, the generated checksums for the one or more files to file checksums included in the secured release bundle information, wherein verification that each of the one or more files is included in the transaction directory is based on the comparison of the generated checksums for the one or more files to the file checksums included in the release bundle information.

22. The method of claim 17, further comprising:

in response to a determination that each of one or more files corresponding to the secured release bundle information is not included in the transaction directory, rejecting, by the one or more processors of the target release device, the software release, wherein verifying the source of the secured release bundle information is based at least in part on one or more encryption keys, and wherein verifying each of the one or more files is included in the transaction directory is based at least in part on one or more checksums.

23. A system for receiving a software release, the system comprising:

a target release device comprising:

at least one memory storing instructions; and one or more processors coupled to the at least one memory, the one or more processors configured to execute the instructions to cause the one or more processors to:

initiate a release bundle transaction session corresponding to a software release;

receive a bundle including secured release bundle information from a computing device distinct from the target release device, the secured release bundle information comprising file meta data corresponding to one or more files and bundle meta data corresponding to an entirety of the one or more files, the bundle meta data comprising a release name and a release version;

verify a source of the secured release bundle information;

after verification of the source, identify a transaction directory;

verify each of one or more files corresponding to the file meta data is included in the transaction directory, the one or more files corresponding to a package type supported by devices of an entity;

close the release bundle transaction session in response to verification, based on the secured release bundle information, that each of the one or more files is included in the transaction directory, making the one or more files corresponding to the software release available for download via an application program interface (API);

in response to verifying that each of the one or more files is included in the transaction directory, generate a checksum for an entirety of the one or more files included in the transaction directory;

compare the checksum for the entirety of the one or more files included in the transaction directory and a bundle checksum included in the secured release bundle information;

authorize transfer of the one or more files from the transaction directory to a memory of a node device based on a match between the checksum for the entirety of the one or more files included in the transaction directory and the bundle checksum; and apply the file meta data included in the secured release bundle information to the one or more files transferred to the memory.

24. The system of claim 23, wherein the secured release bundle information comprises signed release bundle information, and wherein the one or more processors are further configured to execute the instructions to cause the one or more processors to:

identify a signature corresponding to the signed release bundle information, the signature generated based on a private key of a distributor device;

access a public key from a memory of a node device; and decode the signature based on the public key.

25. The system of claim 23, wherein the target release device comprises a server or a node device.

* * * * *

UNITED STATES PATENT AND TRADEMARK OFFICE
CERTIFICATE OF CORRECTION

PATENT NO. : 11,328,096 B2
APPLICATION NO. : 16/898174
DATED : May 10, 2022
INVENTOR(S) : Yoav Landman It is certified that error appears in the above-identified patent and that said Letters Patent is hereby corrected as shown below:

In the Specification

Column 10, Line 22, delete "thereof in" and replace with --thereof. In--.
Column 18, Line 51, delete "etc. in" and replace with --etc. In--.
Column 24, Line 31, delete "FIG. 413" and replace with --FIG. 4B--.
Column 25, Line 30, delete "artifacts files)" and replace with --artifacts (e.g. files)--.
Column 29, Line 45, delete "device, Additionally" and replace with --device. Additionally--.
Column 35, Line 28, delete "(due" and replace with --(e.g. due--.
Column 37, Line 33, delete "ACYL" and replace with --AQL--.
Column 40, Line 65, delete "medium in" and replace with --medium. In--.

In the Claims

Column 41, Claim 1, Line 50, delete "devices, and" and replace with --devices; and--.

Signed and Sealed this
Twelfth Day of July, 2022

Katherine Kelly Vidal
*Director of the United States Patent and Trademark Office*